United States Patent
Sasaki et al.

(10) Patent No.: US 10,177,823 B2
(45) Date of Patent: Jan. 8, 2019

(54) ANTENNA CONTROL APPARATUS, ANTENNA CONTROL PROGRAM, AND ANTENNA CONTROL SYSTEM

(71) Applicant: Nippon Telegraph and Telephone Corporation, Tokyo (JP)

(72) Inventors: Ai-ichiro Sasaki, Atsugi (JP); Akihiko Hirata, Atsugi (JP); Fumiharu Morisawa, Atsugi (JP); Souichi Oka, Atsugi (JP); Osamu Kagami, Atsugi (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 15/541,243

(22) PCT Filed: Sep. 5, 2016

(86) PCT No.: PCT/JP2016/076008
§ 371 (c)(1),
(2) Date: Jun. 30, 2017

(87) PCT Pub. No.: WO2017/163453
PCT Pub. Date: Sep. 28, 2017

(65) Prior Publication Data
US 2018/0109296 A1    Apr. 19, 2018

(30) Foreign Application Priority Data

Mar. 22, 2016  (JP) ................... 2016-056675

(51) Int. Cl.
*H01Q 7/00*   (2006.01)
*H04B 7/04*   (2017.01)
(Continued)

(52) U.S. Cl.
CPC ......... *H04B 7/0408* (2013.01); *H01Q 1/246* (2013.01); *H01Q 3/01* (2013.01); *H01Q 3/02* (2013.01);
(Continued)

(58) Field of Classification Search
CPC combination set(s) only.
See application file for complete search history.

(56) References Cited

U.S. PATENT DOCUMENTS 5,061,941 A * 10/1991 Lizzi .................. G08B 13/2474
                                                340/572.7
5,363,113 A * 11/1994 Mametsa ............. G01R 33/341
                                                343/744
(Continued)

FOREIGN PATENT DOCUMENTS

| CN | 1934751 A | 3/2007 |
|----|-----------|--------|
| JP | S61-277080 A | 12/1986 |

(Continued)

OTHER PUBLICATIONS

English translation of the Written Opinion, PCT Application No. PCT/JP2016/076008, dated Sep. 1, 2017.
(Continued)

*Primary Examiner* — Cindy Trandai
(74) *Attorney, Agent, or Firm* — Kilpatrick Townsend & Stockton LLP

(57) ABSTRACT

Provided is an antenna control technique for forming the boundary of a communication area at a desired location. An antenna parameter control apparatus 2 calculates an antenna parameter in a case of feeding electric currents with an equal intensity in mutually reverse directions to two antennas 1A, 1B which generate a magnetic field. The antenna parameter control apparatus 2 includes an input parameter acquisition unit 21 that acquires input parameters for calculating the
(Continued)

antenna parameter; and a parameter calculation unit 22 that calculates an inter-center distance d between the antennas 1A, 1B as the antenna parameter based on the input parameters.

14 Claims, 7 Drawing Sheets

(51) Int. Cl.
| | | |
|---|---|---|
| H04W 4/80 | (2018.01) | |
| H04B 7/0408 | (2017.01) | |
| H01Q 3/01 | (2006.01) | |
| H01Q 3/02 | (2006.01) | |
| H01Q 1/24 | (2006.01) | |
| H01Q 7/08 | (2006.01) | |
| H04W 16/20 | (2009.01) | |
| H04W 52/02 | (2009.01) | |

(52) U.S. Cl.
CPC .............. *H01Q 7/00* (2013.01); *H01Q 7/08* (2013.01); *H04B 7/04* (2013.01); *H04W 4/80* (2018.02); *H04W 16/20* (2013.01); *H04W 52/0206* (2013.01)

(56) References Cited

U.S. PATENT DOCUMENTS

| | | | |
|---|---|---|---|
| 5,397,986 A * | 3/1995 | Conway | G01V 3/104 324/202 |
| 5,764,196 A * | 6/1998 | Fujimoto | H01Q 7/005 343/742 |
| 6,184,680 B1 * | 2/2001 | Shinoura | B82Y 25/00 324/207.21 |
| 6,313,788 B1 * | 11/2001 | Wilson | G01S 5/0247 342/357.38 |
| 7,142,523 B1 | 11/2006 | Chekuri et al. | |
| 7,268,564 B2 * | 9/2007 | Ozaki | G01R 29/0857 324/632 |
| 7,334,736 B2 * | 2/2008 | Uesaka | G06K 19/07749 235/380 |
| 7,642,973 B2 * | 1/2010 | Maekawa | G01R 29/0814 324/754.23 |
| 9,527,608 B1 * | 12/2016 | Sotnikov | B64G 1/54 |
| 2003/0048220 A1 * | 3/2003 | Gounon | G01S 19/54 342/357.37 |
| 2004/0217916 A1 | 11/2004 | Quintero Illera et al. | |
| 2004/0233119 A1 * | 11/2004 | Chandler | H01Q 13/0208 343/786 |
| 2006/0066495 A1 * | 3/2006 | Isoifovich | H01Q 13/106 343/770 |
| 2006/0114159 A1 * | 6/2006 | Yoshikawa | H01Q 1/24 343/702 |
| 2006/0292704 A1 * | 12/2006 | Bailleul | H03H 2/001 438/3 |
| 2007/0188389 A1 | 8/2007 | Pintos et al. | |
| 2008/0035741 A1 * | 2/2008 | Sakama | G06K 19/07749 235/492 |
| 2008/0117027 A1 * | 5/2008 | Tsirline | H01Q 1/2208 340/10.6 |
| 2008/0258868 A1 * | 10/2008 | Nakajima | B60R 25/24 340/5.72 |
| 2009/0027285 A1 * | 1/2009 | Deguchi | H01Q 1/2216 343/742 |
| 2009/0079268 A1 | 3/2009 | Cook et al. | |
| 2009/0279326 A1 * | 11/2009 | Hyuugaji | H02M 3/33592 363/21.06 |
| 2009/0313811 A1 * | 12/2009 | Takahashi | G11B 5/1278 29/603.23 |
| 2010/0045555 A1 | 2/2010 | Ryou et al. | |
| 2010/0066614 A1 * | 3/2010 | Ishitsuka | H01Q 7/00 343/702 |
| 2010/0127660 A1 | 5/2010 | Cook et al. | |
| 2010/0259257 A1 * | 10/2010 | Sasaki | B82Y 25/00 324/252 |
| 2011/0102287 A1 * | 5/2011 | Noguchi | H01Q 21/065 343/833 |
| 2011/0133726 A1 | 6/2011 | Ballantyne et al. | |
| 2011/0179330 A1 * | 7/2011 | Matsumoto | H04L 1/0051 714/748 |
| 2011/0285577 A1 * | 11/2011 | Sun | G01S 13/36 342/123 |
| 2012/0012655 A1 * | 1/2012 | Kai | H01Q 1/2216 235/439 |
| 2012/0112531 A1 * | 5/2012 | Kesler | B60L 11/182 307/9.1 |
| 2012/0206309 A1 | 8/2012 | Lavedas et al. | |
| 2012/0322372 A1 * | 12/2012 | Hansen | H04B 5/0031 455/41.1 |
| 2013/0078935 A1 * | 3/2013 | Nysen | H01Q 21/28 455/129 |
| 2013/0180263 A1 * | 7/2013 | Choi | F25B 21/00 62/3.1 |
| 2013/0271323 A1 * | 10/2013 | Joo | G01S 3/48 342/442 |
| 2014/0141731 A1 * | 5/2014 | Abudul-Gaffoor | H01Q 1/243 455/78 |
| 2014/0152516 A1 * | 6/2014 | Kim | H04B 5/0031 343/720 |
| 2014/0159941 A1 * | 6/2014 | Yasugi | B61L 23/041 342/28 |
| 2014/0253126 A1 * | 9/2014 | Habara | G01R 33/3415 324/322 |
| 2014/0292093 A1 * | 10/2014 | Matsumoto | H04B 5/0093 307/104 |
| 2017/0310000 A1 * | 10/2017 | Gustavsson | H01Q 1/523 |
| 2017/0344766 A1 * | 11/2017 | Yashiro | G06K 7/10 |
| 2017/0363746 A1 * | 12/2017 | Kadoya | G01S 19/426 |
| 2018/0040416 A1 * | 2/2018 | Lestoquoy | H01F 27/385 |
| 2018/0062774 A1 * | 3/2018 | Blandino | H04W 40/28 |

FOREIGN PATENT DOCUMENTS

| | | |
|---|---|---|
| JP | H02-121503 A | 5/1990 |
| JP | H04-248704 A | 9/1992 |
| JP | H11-032452 A | 2/1999 |
| JP | 2002-095040 A | 3/2002 |
| JP | 2005-503062 A | 1/2005 |
| JP | 2007-531362 A | 1/2005 |
| JP | 2007-174570 A | 7/2007 |
| JP | 2009-539298 A | 11/2009 |
| JP | 2010-539857 A | 12/2010 |
| JP | 2011-071936 A | 4/2011 |
| JP | 2012-500619 A | 1/2012 |
| JP | 2013-125998 A | 6/2013 |
| JP | 2014-026599 A | 2/2014 |
| JP | 2015-508987 A | 3/2015 |
| JP | 5808849 A | 6/2016 |
| WO | 2009/101750 A1 | 8/2009 |
| WO | 2016/084338 A1 | 6/2016 |

OTHER PUBLICATIONS

International Search Report, PCT Patent Application No. PCT/JP2016/076008, dated Nov. 22, 2016.
Written Opinion, PCT Application No. PCT/JP2016/076008, dated Nov. 22, 2016.
Office Action, Japanese Patent Application No. 2016-056675, dated Jun. 30, 2016.
Decision to Grant a Patent, Japanese Patent Application No. 2016-056675, dated Nov. 16, 2016.
Office Action, Chinese Patent Application No, 201680004835.1, dated May 3, 2018.

* cited by examiner

ANTENNA CONTROL APPARATUS, ANTENNA CONTROL PROGRAM, AND ANTENNA CONTROL SYSTEM

This application is a national stage application of PCT/JP2016/076008, which claims priority to Japanese Application No. 2016-056675, both of which are incorporated herein by reference,

TECHNICAL FIELD

The present invention relates to an antenna control technique for forming the boundary of a communication area at a desired location.

BACKGROUND ART

In recent years, there has been increasing a demand for a radio communication system providing a communication area intentionally limited. As such a radio communication system, Patent Document 1 discloses an electric field communication system using an electric field.

PRIOR ART DOCUMENT

Patent Document

Patent Document 1: Japanese Patent Application Publication No. 2007-174570

SUMMARY OF THE INVENTION

Problem to be Solved by the Invention

In the electric field communication system, only a terminal device located in an area near an access point apparatus installed is allowed to perform communications with the access point apparatus. However, an electric field distribution in the proximity of the access point apparatus greatly depends on its installation environment or the posture of a user holding a terminal device. For this reason, some electric field communication system has difficulty in forming the sharp boundary of the communication area. This may cause a case where a terminal device existing at a location where communications are possible cannot perform communications, or a case the other way round. Hence, it has been impossible to build a radio communication system stably offering high reliability.

One of the conceivable reasons causing such difficulty is to use an electric field as a communication medium. This is because the electric field distribution is strongly influenced by a conductor or a dielectric substance existing in the surroundings.

The present invention has been made in view of the foregoing problem, and has an objective to provide an antenna control technique for forming the boundary of a communication area at a desired location.

Means for Solving the Problem

An antenna control apparatus of the present invention to solve the foregoing problem is an antenna control apparatus that controls an inter-center distance between two antennas in a case of feeding the two antennas with electric currents with an equal intensity in mutually reverse directions, the antenna control apparatus including: an input parameter acquisition unit that acquires, as input parameters, a distance from the two antennas to a boundary of a communication area formed by the antennas, and a lower limit value of an attenuation rate of a magnetic field intensity at the boundary of the communication area; and a calculation unit that calculates, based on the distance to the boundary of the communication area and the lower limit value of the attenuation rate of the magnetic field intensity, the inter-center distance between the antennas such that the attenuation rate of the magnetic field intensity equal to the lower limit value is obtained at the boundary of the communication area and the intensity of the electric currents is minimized.

An antenna control program of the present invention is an antenna control program causing a computer to function as the aforementioned antenna control apparatus.

An antenna control system of the present invention includes the aforementioned antenna control apparatus and the two antennas.

Effect of the Invention

According to the present invention, it is possible to provide an antenna control technique for forming the boundary of a communication area at a desired location.

MODE FOR CARRYING OUT THE INVENTION

Hereinafter, embodiments of the present invention are described with reference to the drawings.

In an embodiment, a magnetic field that is less susceptible to the surrounding environment is used to form a sharp boundary of a communication area. Specifically, the sharp boundary of the communication area can be formed by feeding two antennas (magnetic field antennas) with electric currents in mutually reverse directions, respectively.

Even in the case of employing the two antennas (magnetic field antennas), however, the boundary of the communication area cannot be formed at a desired location unless the distance between the centers of the antennas is appropriate. In addition, the boundary of the communication area cannot be formed at the desired location unless the intensity of the electric currents flowing into the antennas is appropriate. In other words, for at least an antenna parameter called an inter-center distance, an appropriate value needs to be calculated. Preferably for an antenna parameter called an electric current intensity, an appropriate value needs to be calculated.

As discussed above, an antenna control system in the present embodiment uses two antennas (magnetic field antennas), each of which is a loop antenna or a bar antenna capable of generating, for example, a low-frequency magnetic field.

The low-frequency magnetic field formed by such an antenna (a magnetic field at about 10 MHz or lower) is characterized in that interaction of the magnetic field with a human body or a surrounding environment is significantly less than that of an electric field. Thus, such a magnetic field is suited to a communication medium for forming the sharp boundary of the communication area. If a radio communication system uses an antenna of this type and thereby can form a sharp magnetic field distribution in which the magnetic field intensity attenuates steeply at the boundary of the communication area, the reliability of the radio communication system providing a limited communication area can be enhanced.

In general, the magnetic field antenna used to form a magnetic field area is a one-turn loop antenna.

Figure 1:
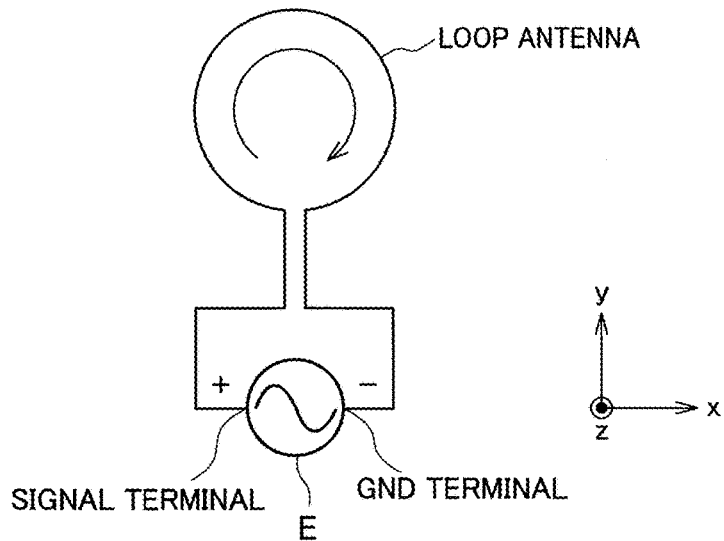
FIG. 1 is a diagram illustrating an example of a one-turn loop antenna.

FIG. 1 is a diagram illustrating an example of a one-turn loop antenna. For example, a positive terminal of the loop antenna is connected to a signal terminal of an alternating current power source E, and a negative terminal of the loop antenna is connected to a GND terminal of the alternating current power source E. Thus, an alternating current flows through the loop antenna.

Figure 2:
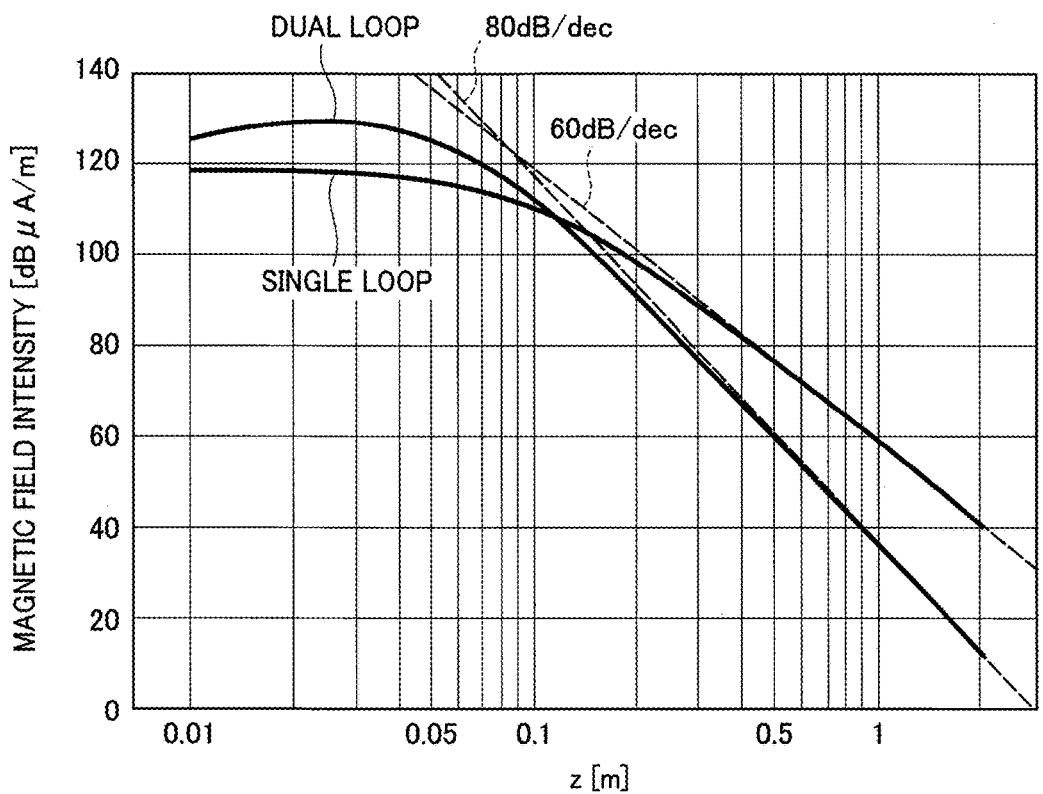
FIG. 2 is a diagram presenting a relation between a distance (z [cm]) from a loop antenna in a z-axis direction and a magnetic field intensity [dBµA/m].

FIG. 2 is a diagram presenting a relationship between a distance z [cm] from a loop antenna in a z-axis direction and a magnetic field intensity [dBµA/m].

The characteristic presented as SINGLE LOOP in FIG. 2 is a characteristic of the magnetic field intensity of a one-turn loop antenna. The attenuation rate of the magnetic field intensity in a far region (z is large) is 60 dB/dec. The attenuation rate of the magnetic field intensity is an indicator representing the sharpness of the boundary of the communication area, and it can be said that the higher the attenuation rate of the magnetic field intensity, the sharper the boundary of the communication area.

The attenuation rate of 60 dB/dec obtained by the one-turn loop antenna is not always sufficient, and therefore there is a demand for a further increase in the attenuation rate of the magnetic field intensity.

Figure 3:
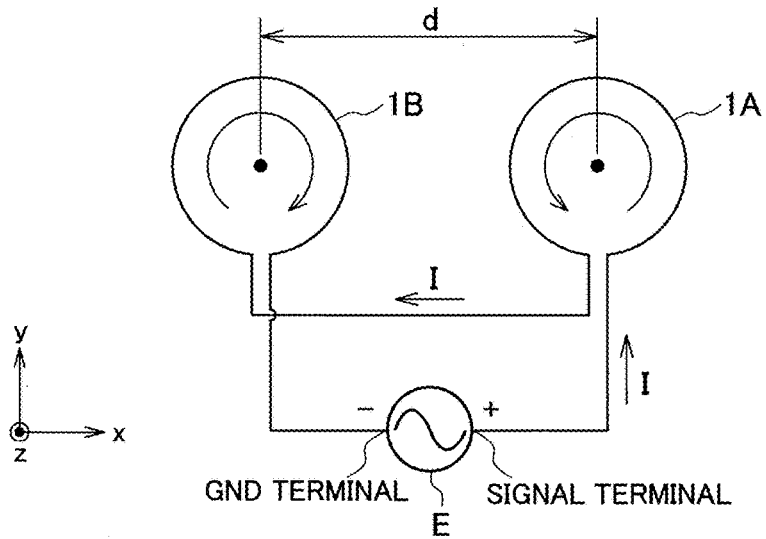
FIG. 3 is a diagram illustrating an example of a loop antenna array for obtaining an attenuation rate at 80 dB/dec of a magnetic field intensity.

FIG. 3 is a diagram illustrating an example of a loop antenna array for obtaining an attenuation rate of a magnetic field intensity at 80 dB/dec which is higher than 60 dB/dec.

Such an attenuation rate of the magnetic field intensity can be obtained by an antenna array including two antennas 1A, 1B arranged next to each other as illustrated in FIG. 3. The antennas 1A, 1B are loop antennas and are formed of a continuous conductive wire. A positive terminal, which is one end of the conductive wire, is connected to the signal terminal of the alternating current power source E, and a negative terminal, which is the other end of the conductive wire, is connected to the GND terminal of the alternating current power source E. Thus, electric currents with an intensity I flow through the antennas 1A, 1B in directions reverse to each other.

The characteristic presented as DUAL LOOP in FIG. 2 is a characteristic of the magnetic field intensity of such a loop antenna array, and the attenuation rate of the magnetic field intensity in a far region is 80 dB/dec.

The loop antenna array illustrated in FIG. 3 has an antenna parameter called an inter-center distance d between the two antennas (loop antennas) 1A, 1B, unlike a single loop antenna.

Figure 4:
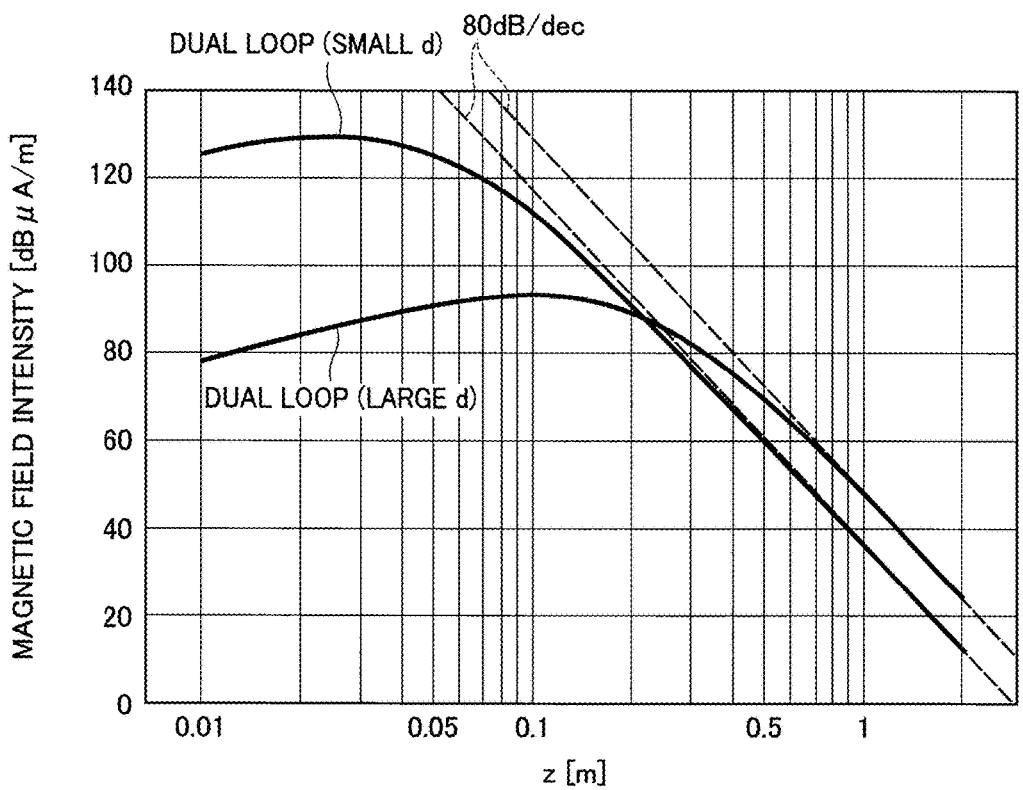
FIG. 4 is a diagram depicting a relation between a distance (z [cm]) from the loop antenna array in FIG. 3 in a z-axis direction and a magnetic field intensity [dBµA/m].

FIG. 4 is a diagram presenting a relationship between the distance from the loop antenna array in FIG. 3 (z [cm]) in the z-axis direction and the magnetic field intensity [dBµA/m].

FIG. 4 presents characteristics of two loop antenna arrays being different in terms of d. The characteristic presented as DUAL LOOP (SMALL d) is a characteristic of the magnetic field intensity of the loop antenna array having smaller d. The characteristic presented as DUAL LOOP (LARGE d) is a characteristic of the magnetic field intensity of the loop antenna array having larger d. In both the loop antenna arrays, the attenuation rate of the magnetic field intensity in a far region is substantially constant at 80 dB/dec. However, the attenuation rate of the magnetic field intensity (characteristic) in the proximity of the loop antenna array (in a region where z is small) depends on d.

For example, in order to form a communication area (magnetic field area) in a size desired by a user by using a loop antenna array including two loop antennas, the optimal d needs to be obtained. However, it has been impossible to obtain the optimal d because a quantitative relationship between d and the distribution of the magnetic field intensity has not been known. In addition, the electric currents flowing in the loop antennas also serve as one of parameters determining the size of a communication area, but a method of obtaining an optimal electric current intensity has not been known so far.

The same problems occur for an antenna array including two bar antennas, and there is also a demand for a solution to these problems.

[First Embodiment]

Figure 5:
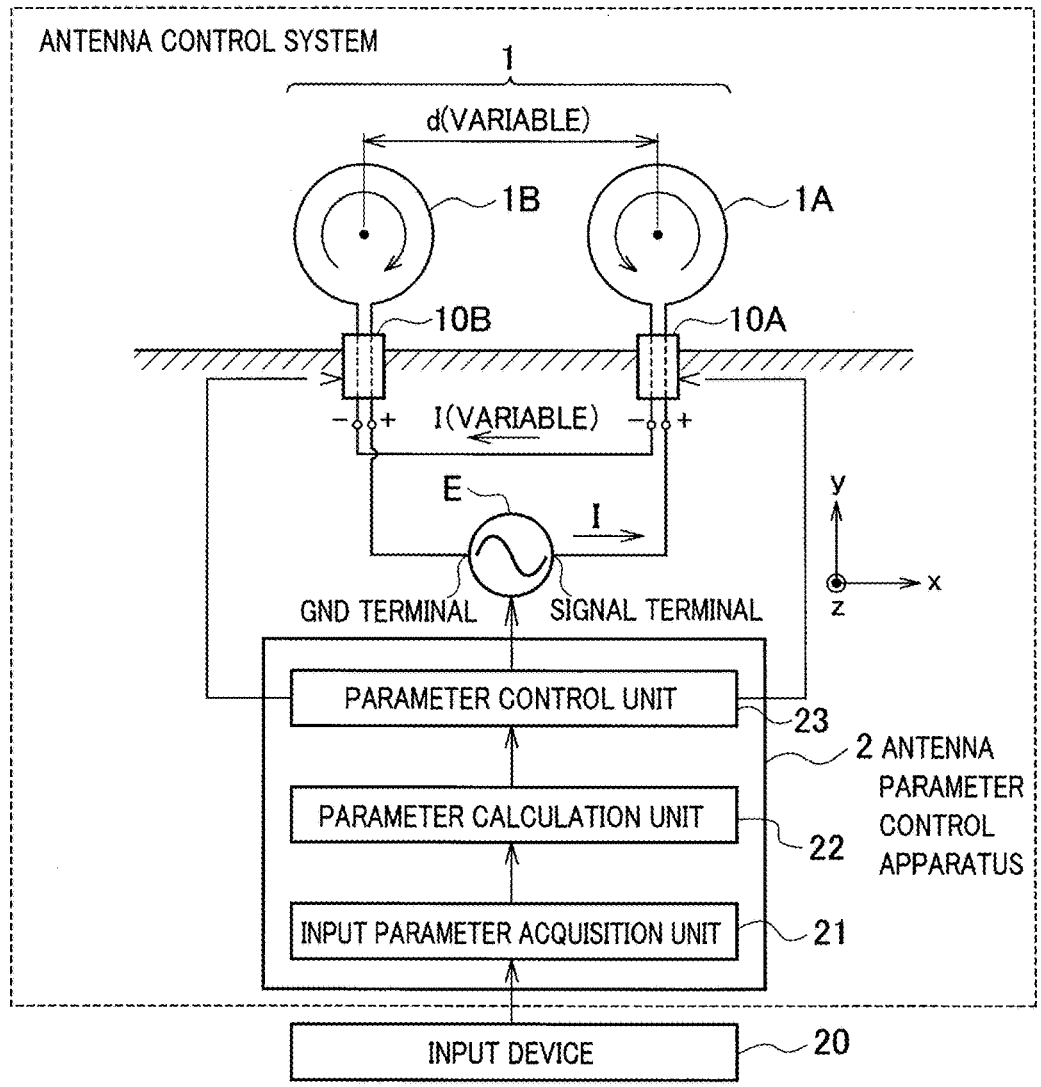
FIG. 5 is a diagram illustrating an example of an antenna control system in a first embodiment.

FIG. 5 is a diagram illustrating an example of an antenna control system in a first embodiment.

An antenna parameter control apparatus 2 included in the antenna control system is connected to two antennas 1A, 1B which are capable of producing not an electric field but a magnetic field. The antenna parameter control apparatus 2 is capable of adjusting an inter-center distance d between the antennas 1A, 1B as appropriate.

The antenna control system includes an antenna array 1, the antenna parameter control apparatus 2, an alternating current power source E, and mechanical stages 10A, 10B.

The antenna array 1 includes the two antennas 1A, 1B. The antennas 1A, 1B are arranged side by side in an x-axis direction in FIG. 5, for example. The antenna parameter control apparatus 2 calculates antenna parameters in a case of feeding the two antennas 1A, 1B with electric currents with an equal intensity I in directions reverse to each other, and controls the antenna parameters for the two antennas 1A, 1B based on the calculated antenna parameters. The alternating current power source E supplies an alternating current with an intensity I to the antennas 1A, 1B. The mechanical stages 10A, 10B are for changing the positions of the antennas 1A, 1B.

The antenna parameter control apparatus 2 is connected to an input device 20 such as a keyboard and a touch pad to which a user inputs input parameters. Here, the alternating current power source E and the mechanical stages 10A, 10B may be provided outside the antenna control system.

The antenna parameter control apparatus 2 includes an input parameter acquisition unit 21, a parameter calculation unit 22, and a parameter control unit 23.

From the input device 20, the input parameter acquisition unit 21 acquires the input parameters inputted to the input device 20 by the user. The parameter calculation unit 22 calculates the antenna parameters by using the input parameters. The parameter control unit 23 controls the antenna parameters for the antennas 1A, 1B based on the antenna parameters calculated by the parameter calculation unit 22.

Figure 6:
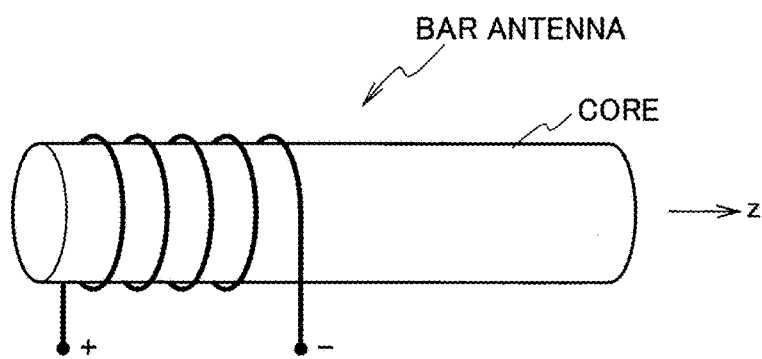
FIG. 6 is a diagram illustrating an example of a configuration of a bar antenna.

The antennas 1A, 1B are loop antennas as illustrated in FIG. 5 or bar antennas as illustrated in FIG. 6, and are arranged next to each other, for example. The loop antennas, if used, are arranged such that directions passing through the loop antennas are aligned with the z-axis direction in FIG. 5. The bar antennas, if used, are arranged such that longitudinal directions of cores included in the bar antennas are aligned with the z-axis direction in FIG. 5. Here, any type of antennas other than these loop antennas or bar antennas may be used as long as the antennas each include two terminals such as the positive terminal and the negative terminal.

The antennas 1A, 1B preferably have the same shape. For example, if the antennas 1A, 1B are loop antennas, each of the antennas 1A, 1B has a circular shape. The shape may be any shape other than a circular shape. Instead, if the antennas 1A, 1B are bar antennas, the antennas 1A, 1B are wound around cores in the same shape (for example, a columnar shape). Moreover, the antennas 1A, 1B are also preferably the same in size.

The following description is provided on the assumption that the antennas 1A, 1B are loop antennas for convenience.

The positive terminal of the antenna 1A on one side is connected to the signal terminal of the alternating current power source E, the negative terminal of the antenna 1A is connected to the negative terminal of the antenna 1B on the other side, and the positive terminal of the antenna 1B is connected to the GND terminal of the alternating current power source E.

When the antennas 1A, 1B are connected in series with the polarities of their terminals arranged reverse to each other, the single alternating current power source E can always supply an electric current with an intensity I to the antennas 1A, 1B in the reverse directions.

At a time when the signal terminal of the alternating current power source E is at a plus voltage, an anti-clockwise electric current flows in the loop antenna 1A and a clockwise electric current flows in the loop antenna 1B when viewed in the direction passing through the antennas 1A, 1B, namely, in the z-axis direction. Oppositely, at a time when the signal terminal of the alternating current power source E is at a minus voltage, a clockwise electric current flows in the loop antenna 1A and an anti-clockwise electric current flows in the loop antenna 1B.

Thus, the total sum of magnetic dipole moment vectors of the antennas 1A, 1B is zero, and the magnetic fields formed in a far region by the antennas 1A, 1B are cancelled out each other. As a result, at a location far from the antenna array 1 in the z-axis direction of FIG. 5, the magnetic field intensity steeply attenuates and the attenuation rate of the magnetic field intensity of 80 dB/dec as illustrated in FIGS. 2 and 4 can be obtained.

In the antenna control system, the electric current intensity I, which is one of antenna parameters for the antennas 1A, 1B, is variable. For example, the alternating current power source E is configured to change the electric current intensity I of the current to flow from the alternating current power source E to the antenna array 1 according to a control signal received from the parameter control unit 23. The parameter control unit 23 sends this control signal to the alternating current power source E, and thereby adjusts the electric current intensity I. In this way, any electric current intensity I can be set as appropriate. Note that the antennas 1A, 1B may be provided with respective alternating current power sources so as to be fed with electric currents individually.

In the antenna control system, the inter-center distance d, which is one of antenna parameters for the antennas 1A, 1B, is variable. For example, the mechanical stages 10A, 10B are configured to support the antennas 1A, 1B, respectively, and change their own positions according to a control signal. The parameter control unit 23 sends this control signal to the mechanical stages 10A, 10B, and thereby adjusts the positions of the mechanical stages. In this way, the inter-center distance d can be adjusted to any distance as appropriate.

Since the electric currents with the equal intensity I in the reverse directions flow into the respective antennas 1A, 1B in the antenna array 1, the attenuation rate of the magnetic field intensity at 80 dB/dec can be obtained in a far region, but the attenuation rate of the magnetic field intensity in the proximity of the antenna array 1 (at a close location in the z-axis direction) is lowered. Moreover, the attenuation rate of the magnetic field intensity in the proximity of the antenna array 1 is not constant.

Hence, it is necessary to set the antenna parameters for the antennas 1A, 1B appropriately, and thereby to obtain a desired attenuation rate of the magnetic field intensity at the boundary of the communication area formed by the antennas 1A, 1B. Moreover, since communications are impossible if the magnetic field intensity is too low, it is also necessary to obtain a desired magnetic field intensity at the boundary of the communication area. These desired magnetic field intensity and desired attenuation rate of the magnetic field intensity are input parameters necessary for the antenna parameter control apparatus 2 to calculate the antenna parameters.

The antenna control system calculates an appropriate inter-center distance $d_{opt}$ and an appropriate electric current intensity $I_{opt}$ based on the input parameters inputted by a user, and performs control such that the inter-center distance d between the antennas 1A, 1B and the electric current intensity I of the current flow to the two antennas 1A, 1B equal to $d_{opt}$ and $I_{opt}$, respectively.

Hereinafter, description is provided for a method of calculating $d_{opt}$ and $I_{opt}$.

Figure 7:
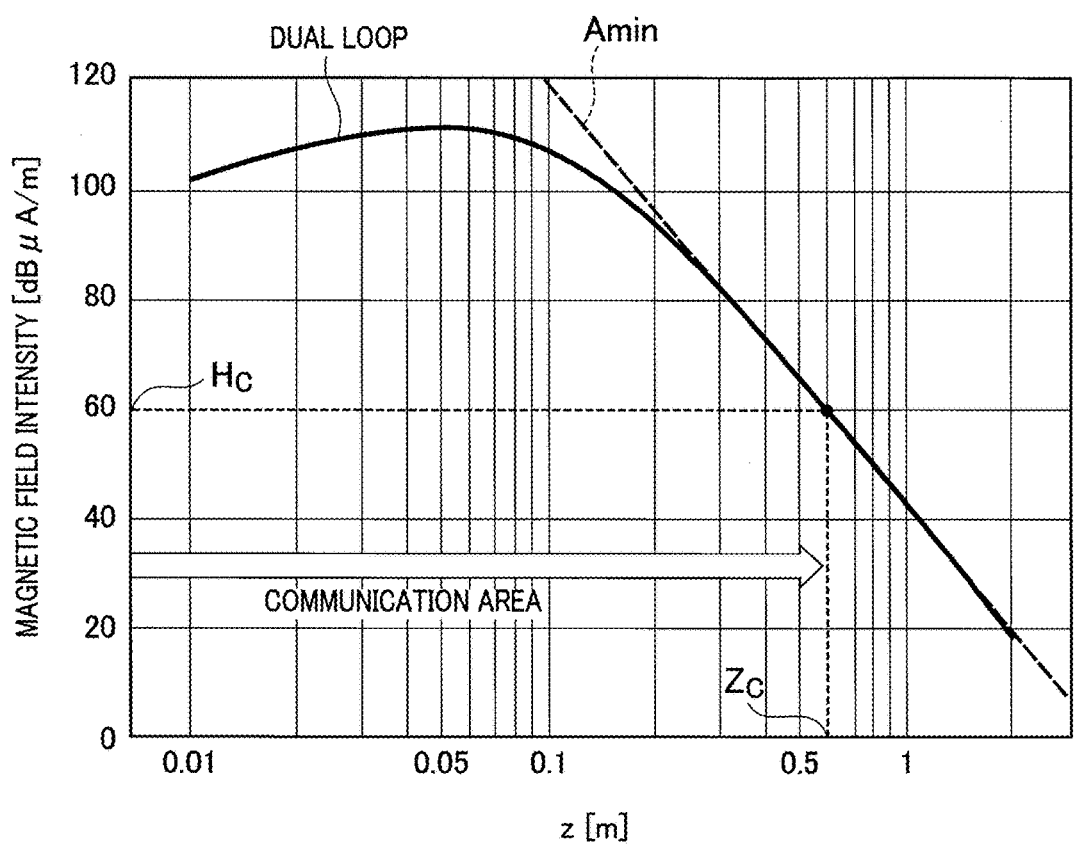
FIG. 7 is a diagram for explaining a method of selecting input parameters in the first embodiment.

FIG. 7 is a diagram for explaining a method of selecting input parameters in the first embodiment.

A user inputs five input parameters to the input device 20 by taking into account the size and characteristics of a communication area desired by himself/herself.

A first input parameter is a distance $Z_C$ from the antennas 1A, 1B to the boundary (edge) of a communication area (magnetic field area) formed by these antennas. Here, $Z_C$ is a distance in the z-axis direction of FIG. 5. In other words, $Z_C$ can be said to be an input parameter indicating the size of the communication area. A second input parameter is a magnetic field intensity $H_C$ required at the boundary of the communication area, that is, the location at $Z_C$. A third parameter is a lower limit value $A_{min}$ of the attenuation rate of the magnetic field intensity required at the boundary of the communication area, that is, the location at $Z_C$. A fourth input parameter is an upper limit value $d_{max}$ of the inter-center distance d between the antennas 1A, 1B. A fifth input parameter is an upper limit value $I_{max}$ of the electric current flow to the antennas 1A, 1B.

The boundary of the communication area is established at a location at the distance $Z_C$ from the antenna array 1 in the z-axis direction, that is, the direction passing through the loop antennas. The communication area extends over the distance from 0 to $Z_C$ in the z-axis direction. In FIG. 7, DUAL LOOP presents a characteristic of the intensity of a magnetic field formed by the antenna array 1, and this is assumed to be a characteristic desired by the user. The magnetic field intensity at the location at $Z_C$ is the magnetic field intensity $H_C$. Moreover, the lower limit value of the attenuation rate of the magnetic field intensity at the location at $Z_C$ is $A_{min}$. The lower limit value $A_{min}$ is a lower limit value of a slope (the attenuation rate of the magnetic field intensity) of a tangent at the location at $Z_C$ to the curve presenting the characteristic of DUAL LOOP.

Examples of units of these input parameters are $Z_C$ [m], $H_C$ [dBpµA/m], $A_{min}$ [dB/dec], $d_{max}$ [m], and $I_{max}$ [A].

Returning to FIG. 5, the description is continued.

The user inputs the distance $Z_C$ to the boundary of the communication area, the magnetic field intensity $H_C$, the lower limit value $A_{min}$ of the attenuation rate of the magnetic field intensity, the upper limit value $d_{max}$ of the inter-center distance d, the upper limit value $I_{max}$ of the electric current intensity I of the current flow to the antenna array 1 as the input parameters to the input device 20 such as a keyboard. Here, since the upper limit value of the attenuation rate of the magnetic field intensity achievable by the antenna array 1 (two antennas) is 80 dB/dec, a value less than 80 dB/dec needs to be inputted as $A_{min}$. For example, the user is given such information in advance.

The input parameter acquisition unit 21 of the antenna parameter control apparatus 2 acquires these input parameters from the input device 20, and outputs the input parameters to the parameter calculation unit 22. Here, the upper limit value $I_{max}$ of the electric current intensity I is determined by the performance specifications and the like of the alternating current power source E, and cannot be known by the user in some cases. For such a case, the upper limit value $I_{max}$ may be stored in advance in a memory of the antenna parameter control apparatus 2. In addition, the upper limit value $d_{max}$ of the inter-center distance d is determined by the movable ranges and the like of the mechanical stages 10A, 10B, and cannot be known by the user in some cases. For such a case, the upper limit value $d_{max}$ may be stored in advance in the memory of the antenna parameter control apparatus 2. In these cases, the input parameter acquisition unit 21 acquires the upper limit value of the electric current intensity I and the upper limit value $d_{max}$ of the inter-center distance d from the memory.

The parameter calculation unit 22 of the antenna parameter control apparatus 2 calculates the inter-center distance $d_{opt}$ satisfying the conditions that the requirements indicated by the five input parameters are satisfied and the electric current intensity I is minimized, and the electric current intensity $I_{opt}$ under the above conditions.

Specifically, based on the distance $Z_C$ and the lower limit value $A_{min}$ of the attenuation rate of the magnetic field intensity, the parameter calculation unit 22 calculates an inter-center distance $d'_{opt}$ ($d_{opt}$) as an antenna parameter such that the attenuation rate of the magnetic field intensity equal to the lower limit value $A_{min}$ can be obtained at the boundary of the communication area and the electric current intensity I is minimized.

Based on the distance $Z_C$, the magnetic field intensity $H_C$, and the lower limit value $A_{min}$ of the attenuation rate of the magnetic field intensity, the parameter calculation unit 22 calculates a minimum electric current intensity $I'_{opt}$ ($I_{opt}$) as an antenna parameter such that the magnetic field intensity $H_C$ and the attenuation rate of the magnetic field intensity equal to the lower limit value $A_{min}$ can be obtained at the boundary of the communication area.

Here, if the calculated inter-center distance $d'_{opt}$ is longer than the upper limit value $d_{max}$, the parameter calculation unit 22 calculates a minimum electric current intensity $I''_{opt}$ ($I_{opt}$) as the antenna parameter based on the distance $Z_C$, the magnetic field intensity $H_C$, and the upper limit value $d_{max}$ ($d_{opt}=d''_{opt}$) such that the magnetic field intensity $H_C$ can be obtained at the boundary of the communication area with the inter-center distance d set equal to the upper limit value $d_{max}$.

Then, the parameter calculation unit 22 outputs the calculated antenna parameters to the parameter control unit 23.

The parameter control unit 23 controls the antenna parameters for the antennas 1A, 1B based on the antenna parameters calculated by the parameter calculation unit 22.

Specifically, the parameter control unit 23 controls the inter-center distance d between the antennas 1A, 1B (antenna parameter) based on the calculated inter-center distance $d_{opt}$ ($d'_{opt}$ or $d''_{opt}$). For example, the parameter control unit 23 sends a control signal to the mechanical stages 10A, 10B, and thereby controls the mechanical stages 10A, 10B such that the inter-center distance d equals to the calculated inter-center distance $d_{opt}$ ($d'_{opt}$ or $d''_{opt}$).

The parameter control unit 23 controls the electric current intensity I of the current flow to the antennas 1A, 1B (antenna parameter) based on the calculated electric current intensity $I_{opt}$ ($I'_{opt}$ or $I''_{opt}$). For example, the parameter control unit 23 sends a control signal to the alternating current power source E, and thereby controls the alternating current power source E such that the electric current intensity I of the current flow to the antennas 1A, 1B equals to the calculated electric current intensity $I_{opt}$ ($I'_{opt}$ or $I''_{opt}$).

Figure 8:
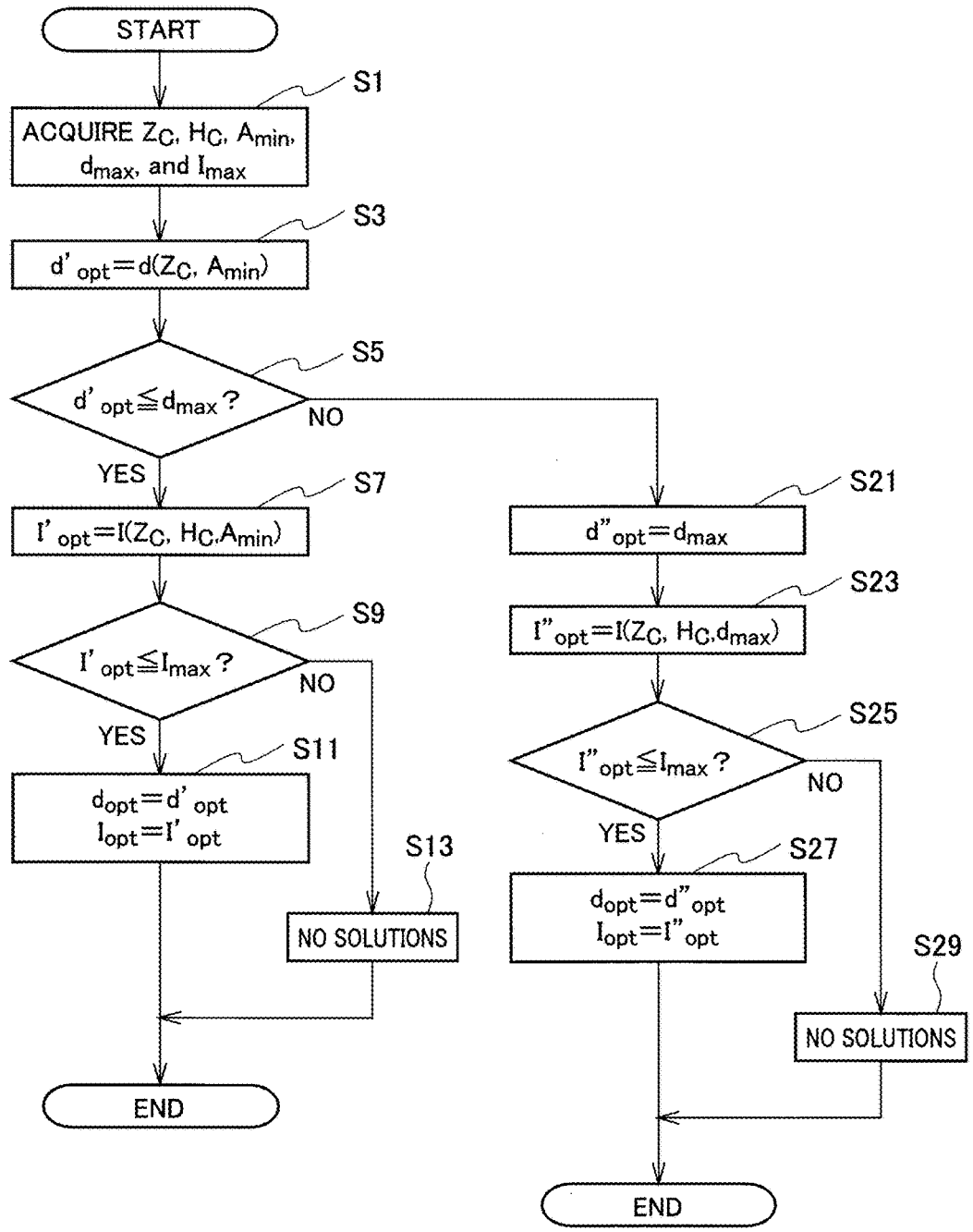
FIG. 8 is a flowchart presenting an example of a method of calculating antenna parameters in the first embodiment.

FIG. 8 is a flowchart presenting an example of a method of calculating the antenna parameters in the first embodiment.

The parameter calculation unit 22 of the antenna parameter control apparatus 2 first acquires $Z_C$, $H_C$, $A_{min}$, $d_{max}$, and $I_{max}$ from the input device 20 and so on as described above (S1).

Next, the parameter calculation unit 22 calculates the inter-center distance $d'_{opt}$ between the antennas as a first candidate for $d_{opt}$ (S3).

In the antenna control system in FIG. 5, it is desirable to make the electric current intensity I as low as possible. This is because an alternating current power source E with relatively low performance specifications can be used. In general, a longer d is more advantageous in order to reduce I. On the other hand, if the inter-center distance d is made longer, the attenuation rate of the magnetic field intensity at the boundary (the location at $Z_C$) of the communication area is reduced. By taking these conditions into account, in step S3, the parameter calculation unit 22 first calculates, as $d'_{opt}$, d that makes the attenuation rate of the magnetic field intensity at $Z_C$ equal to the minimum necessary value, that is, $A_{min}$ (S3).

Here, supplementary explanation is provided for a technical basis underlying the following calculation formulas.

The distribution of a magnetic field intensity formed by a magnetic dipole (for example, a single loop antenna) arranged at the origin is known to be expressed by polar coordinates as follows.

[Formula 1]

$$\begin{pmatrix} h_r \\ h_\theta \\ h_\phi \end{pmatrix} = \frac{m}{4\pi r^3} \begin{pmatrix} 2\cos\theta \\ \sin\theta \\ 0 \end{pmatrix} \quad (A1)$$

Here, m denotes a magnetic dipole moment. Then, provided that the electric current intensity for the antennas is I, the following formula holds for m.

[Formula 2]

$$m = IS_{eff} \quad (A2)$$

Here, $S_{eff}$ denotes a constant indicating the effective area of an antenna, and depends on the shape or material of the antenna. For example, provided that the antenna is a loop antenna, that $S_0$ denotes the area of a region enclosed by the loop antenna, and that N denotes the number of turns of the loop antenna, $S_{eff}$ can be approximately expressed by the following formula.

[Formula 3]

$$S_{eff} \approx NS_0 \quad (A3)$$

Here, the formula (A1) is expressed by rectangular coordinates as follows.

[Formula 4]

$$\begin{pmatrix} h_x \\ h_y \\ h_z \end{pmatrix} = \frac{IS_{eff}}{4\pi(x^2 + y^2 + z^2)^{5/2}} \begin{pmatrix} 3zx \\ 3zy \\ 2z^2 - x^2 - y^2 \end{pmatrix} \quad (A4)$$

Here, assume that m and −m magnetic dipoles are arranged at the positions of the coordinates (−d/2, 0, 0) and (d/2, 0, 0), respectively. These two magnetic dipoles are equivalent to two antennas having an inter-center distance d. The distribution of the magnetic field intensity (absolute value) formed on the z axis by such antennas is expressed using the formula (A2) as follows.

[Formula 5]

$$h(z, d) = \frac{3}{4\pi} \cdot \frac{IS_{eff} d}{z^4} \cdot \left\{ 1 + \left(\frac{d}{2z}\right)^2 \right\}^{-5/2} \quad (A5)$$

Here, the following formula is employed to obtain the magnetic field intensity expressed by decibel.

[Formula 6]

$$H(z, d) = \quad (A6)$$
$$120 + 20\log_{10} h(z, d) = 120 + 20\log_{10}\left[ \frac{3}{4\pi} \cdot \frac{IS_{eff} d}{z^4} \cdot \left\{ 1 + \left(\frac{d}{2z}\right)^2 \right\}^{-5/2} \right]$$

The unit of H(z, d) is [dBµA/m] and the unit of h(z, d) is [A/m].

The following formula is obtained by solving the formula (A6) for I.

[Formula 7]

$$I(z, H, d) = \frac{4\pi}{3} \cdot 10^{(H-120)/20} \cdot \frac{z^4}{S_{eff} d} \cdot \left\{ 1 + \left(\frac{d}{2z}\right)^2 \right\}^{5/2} \quad (A7)$$

The formula (A7) indicates that the electric current intensity I of the current flow to the antennas can be calculated if the coordinate z, the magnetic field intensity H at that location and the inter-center distance d between the antennas are known.

Here, a new variable λ, is defined by the following formula.

[Formula 8]

$$\lambda = \log_{10} z \quad (A8)$$

Using the above formula, the attenuation rate A [dB/dec] of the magnetic field intensity can be expressed by the following formula.

[Formula 9]

$$A(z, d) = -\frac{\partial H(z, d)}{\partial \lambda} = 80 - 100\left\{ 1 + \left(\frac{2z}{d}\right)^2 \right\}^{-1} \quad (A9)$$

The formula (A9) indicates that the attenuation rate of the magnetic field intensity formed by the two antennas gradually approximates to 80 dB/dec in a far region.

[Formula 10]

$$d = 2z \cdot \sqrt{\frac{80 - A}{20 + A}} \quad (A10)$$

The above formula is obtained by solving the formula (A9) for d.

The formula (A10) indicates that the inter-center distance d between the antennas can be calculated if the coordinate z and the attenuation rate A of the magnetic field intensity at the coordinate z are known.

Moreover, the following formula is obtained by substituting the formula (A10) into the formula (A7).

[Formula 11]

$$I(z, H, A) = \frac{2\pi}{3} \cdot 10^{(H-120)/20} \cdot \frac{z^3}{S_{eff}} \cdot \sqrt{\frac{20 + A}{80 - A}} \cdot \left(\frac{100}{20 + A}\right)^{5/2} \quad (A11)$$

The formula (A11) indicates that the electric current intensity I of the current flow to the antennas can be calculated if the coordinate z is known and the magnetic field intensity H and the attenuation rate A of the magnetic field intensity at the coordinate z are known.

Returning to FIG. 8, the description is continued.

In step S3, when z and A are given, the parameter calculation unit 22 is already given the formula (A10) for obtaining d.

[Formula 12]

$$d'_{opt} = d(Z_C, A_{min}) = 2Z_C \cdot \sqrt{\frac{80 - A_{min}}{20 + A_{min}}} \quad (1)$$

In accordance with this, the parameter calculation unit 22 calculates d'$_{opt}$ (S3).

More specifically, based on the distance $Z_C$ to the boundary of the communication area and the lower limit value $A_{min}$ of the attenuation rate of the magnetic field intensity, the parameter calculation unit 22 calculates the inter-center distance d'$_{opt}$ as the antenna parameter such that the attenuation rate of the magnetic field intensity equal to the lower limit value $A_{min}$ can be obtained at the boundary (the location at $Z_C$) of the communication area and the electric current intensity I of the current flow to the antennas is minimized. In short, the inter-center distance d'$_{opt}$ can be calculated by using the formula (1).

Next, the parameter calculation unit 22 determines whether or not d'$_{opt}$ satisfies the user's input requirement defined by the following formula (S5).

[Formula 13]

$$d'_{opt} \leq d_{max} \quad (2)$$

Hereinafter, the description is further provided for each of the cases.

(i) Case where d'$_{opt} \leq d_{max}$ (S5: YES)

In this case, since d'$_{opt}$ satisfies the requirement for d, the parameter calculation unit 22 determines whether or not the requirement for the electric currents is satisfied.

Here, the parameter calculation unit 22 is already given the formula (A11) for obtaining I from z, H, and A.

[Formula 14]

$$I'_{opt} = I(Z_C, H_C, A_{min}) = \quad (3)$$

$$\frac{2\pi}{3} \cdot 10^{(H_C - 120)/20} \cdot \frac{Z_C^3}{S_{eff}} \cdot \sqrt{\frac{20 + A_{min}}{80 - A_{min}}} \cdot \left(\frac{100}{20 + A_{min}}\right)^{5/2}$$

In accordance with this, the electric current intensity I'$_{opt}$ of the current flow to the antennas is calculated as a first candidate for I$_{opt}$ (S7). Here, S$_{eff}$ denotes a constant indicating the effective area of each of the antennas 1A, 1B.

More specifically, based on the distance $Z_C$ to boundary of the communication area, the magnetic field intensity $H_C$, and the lower limit value $A_{min}$ of the attenuation rate of the magnetic field intensity, the parameter calculation unit 22 calculates the minimum electric current intensity I'$_{opt}$ as the antenna parameter such that the magnetic field intensity $H_C$ and the attenuation rate of the magnetic field intensity equal to the lower limit value $A_{min}$ can be obtained at the boundary (the location at $Z_C$) of the communication area. In short, the electric current intensity I'$_{opt}$ can be calculated by using the formula (3).

Next, the parameter calculation unit 22 determines whether or not I'$_{opt}$ satisfies the user's input requirement (S9).

[Formula 15]

$$I'_{opt} \leq I_{max} \quad (4)$$

Specifically, the parameter calculation unit 22 determines whether or not I'$_{opt}$ satisfies the above formula (S9).

If YES is determined in step S9, that is, if the formula (4) is satisfied, I'$_{opt}$ satisfies the user's input requirement. In this case, the parameter calculation unit 22 outputs d'$_{opt}$, which is the first candidate for d$_{opt}$, as d$_{opt}$ (optimal solution) to the parameter control unit 23, outputs I'$_{opt}$, which is the first candidate for I$_{opt}$, as I$_{opt}$ (optimal solution) to the parameter control unit 23 (S11), and then terminates the processing.

In conclusion, the first candidates d'$_{opt}$ and I'$_{opt}$ are determined as true optimal solutions as in the following formula.

[Formula 16]

$$(d_{opt}, I_{opt}) = (d'_{opt}, I'_{opt}) = \left(2Z_C \cdot \sqrt{\frac{80 - A_{min}}{20 + A_{min}}},\right. \quad (5)$$

$$\left.\frac{2\pi}{3} \cdot 10^{(H_C - 120)/20} \cdot \frac{Z_C^3}{S_{eff}} \cdot \sqrt{\frac{20 + A_{min}}{80 - A_{min}}} \cdot \left(\frac{100}{20 + A_{min}}\right)^{5/2}\right)$$

On the other hand, if NO is determined in step S9, solutions (d$_{opt}$, I$_{opt}$) satisfying the user's input requirements do not exist. This is because d needs to be made larger in order to satisfy the formula (4), but in that case, the attenuation rate $A(Z_C)$ of the magnetic field intensity at the boundary (the location at $Z_C$) of the communication area is lower than $A_{min}$ ($A(Z_C) < A_{min}$). This means that the requirement for the attenuation rate of the magnetic field intensity is not satisfied. Hence, in this case, the parameter calculation unit 22 determines "no solutions", then, for example, displays an alert indication on a display device or the like to prompt the user to input another input parameter(s) (S13), and terminates the processing.

(ii) Case where d'$_{opt} > d_{max}$ (S5: NO)

If the calculated inter-center distance d'$_{opt}$ is longer than the upper limit value d$_{max}$, the parameter calculation unit 22 employs d$_{max}$ as d''$_{opt}$ which is a second candidate for d$_{opt}$ as in the following formula (S21).

[Formula 17]

$$d''_{opt} = d_{max} \quad (6)$$

Next, the parameter calculation unit 22 calculates the electric current intensity I''$_{opt}$ of the current flow to the antennas as a second candidate for I$_{opt}$. This calculation may use the formula (A7) for obtaining I from z, H, and d.

More specifically, the parameter calculation unit 22 uses the following formula.

[Formula 18]

$$I''_{opt} = I(Z_C, H_C, d_{max}) = \frac{4\pi}{3} \cdot 10^{(H_C - 120)/20} \cdot \frac{Z_C^4}{S_{eff} d_{max}} \cdot \left(1 + \left(\frac{d_{max}}{2Z_C}\right)^2\right)^{5/2} \quad (7)$$

In accordance with this, the parameter calculation unit 22 calculates I''$_{opt}$, which is the second candidate for I$_{opt}$ (S23).

More specifically, based on the distance $Z_C$, the magnetic field intensity $H_C$, and the upper limit value d$_{max}$ of the inter-center distance, the parameter calculation unit 22 calculates the minimum electric current intensity I''$_{opt}$ as an antenna parameter such that the magnetic field intensity $H_C$ can be obtained at the boundary (the location at $Z_C$) of the communication area with the inter-center distance d set equal to the upper limit value d$_{max}$ (S23). In short, the electric current intensity I''$_{opt}$ can be calculated by using the formula (7).

Next, the parameter calculation unit 22 determines whether or not I'$_{opt}$, which is the second candidate for I$_{opt}$, satisfies the user's input requirement (S25).

[Formula 19]

$$I''_{opt} \leq I_{max} \quad (8)$$

Specifically, the parameter calculation unit 22 determines whether or not $I'_{opt}$ satisfies the above formula (S25).

If YES is determined in step S25, that is, if the formula (8) is satisfied, $I''_{opt}$ satisfies the user's input requirement.

Thus, the parameter calculation unit 22 outputs $d''_{opt}$ ($=d_{max}$), which is the second candidate for $d_{opt}$, as $d_{opt}$ (optimal solution) to the parameter control unit 23, outputs $I''_{opt}$, which is the second candidate for $I_{opt}$, as $I_{opt}$ (optimal solution) to the parameter control unit 23 (S27), and terminates the processing.

In conclusion, the second candidates $d''_{opt}$ ($=d_{max}$) and $I''_{opt}$ are determined as true optimal solutions as in the following formula.

[Formula 20]

$$(d_{opt}, I_{opt}) = (d''_{opt}, I''_{opt}) = (d_{max}, I(Z_C, H_C, d_{max})) = \quad (9)$$
$$\left( d_{max}, \frac{4\pi}{3} \cdot 10^{(H_C - 120)/20} \cdot \frac{Z_C^4}{S_{eff} d_{max}} \cdot \left(1 + \left(\frac{d_{max}}{2Z_C}\right)^2\right)^{5/2} \right)$$

On the other hand, if NO is determined in step S25, that is, if the calculated electric current intensity $I''_{opt}$ is higher than the upper limit value $I_{max}$, solutions ($d_{opt}$, $I_{opt}$) satisfying the user's input requirements do not exist. This is because d needs to be made larger in order to satisfy the formula (8), but in that case, $d''_{opt} > d_{max}$ holds. This means that the requirement for the inter-center distance is not satisfied. Hence, in this case, the parameter calculation unit 22 determines "no solutions", then, for example, displays an alert indication on the display device or the like to prompt the user to input another input parameter(s) (S29), and terminates the processing.

Here, $d_{max}$ and $I_{max}$ are not indispensable in a case, for example, where the performance specifications of the alternating current power source E and the movable ranges of the mechanical stages 10A, 10B are limitless. That is, $d_{max}$ and $I_{max}$ are employed as the input requirements in the first embodiment, but they are not essential.

In this case, the processing may proceed from step S3 to step S7 while skipping step S5, and proceed from step S7 to step 11 while skipping step 9. In other words, $d'_{opt}$ obtained by the formula (1) may be used as $d_{opt}$, and $I'_{opt}$ obtained by the formula (3) may be used as $I_{opt}$.

As described above, the antenna parameter control apparatus 2 of the first embodiment is an antenna parameter control apparatus that calculates antenna parameters in a case of feeding the two antennas 1A, 1B with electric currents with an equal intensity I in the mutually reverse directions, and includes the input parameter acquisition unit 21 that acquires the input parameters for calculating the antenna parameters, and the parameter calculation unit 22 that calculates the inter-center distance between the antennas as the antenna parameter based on the input parameters. Thus, in the present embodiment, it is possible to provide an antenna control technique for forming the boundary of the communication area at a desired location. Specifically, it is possible to calculate the inter-center distance between the antennas (antenna parameter) for forming the boundary of the communication area at a desired location.

The input parameter acquisition unit 21 acquires, as the input parameters, the distance $Z_C$ from the antennas to the boundary of the communication area formed by the antennas and the lower limit value $A_{min}$ of the attenuation rate of the magnetic field intensity required at the boundary of the communication area (S1). Then, based on the distance $Z_C$ and the lower limit value $A_{min}$ of the attenuation rate of the magnetic field intensity, the parameter calculation unit 22 calculates the inter-center distance $d'_{opt}$ between the antennas as the antenna parameter such that the attenuation rate of the magnetic field intensity equal to the lower limit value $A_{min}$ can be obtained at the boundary of the communication area and the electric current intensity I is minimized (S3). Thus, in the present embodiment, it is possible to calculate the inter-center distance between the antennas for forming the boundary of the communication area at a desired location. In addition, since the electric current intensity I is minimized, the power consumption can be reduced.

The input parameter acquisition unit 21 acquires the magnetic field intensity $H_C$ required at the boundary of the communication area (S1). Then, based on the distance $Z_C$, the magnetic field intensity $H_C$, and the lower limit value $A_{min}$ of the attenuation rate, the parameter calculation unit 22 calculates the minimum electric current intensity $I'_{opt}$ as the antenna parameter such that the magnetic field intensity $H_C$ and the attenuation rate of the magnetic field intensity equal to the lower limit value $A_{min}$ can be obtained at the boundary of the communication area (S7). Thus, it is possible to calculate the electric current intensity of the current flow to the antennas in order to form the boundary of the communication area at a desired location. Since the electric current intensity I is minimized, the power consumption can be reduced.

Note that, in the first embodiment, only either one of the inter-center distance $d'_{opt}$ between the antennas and $I'_{opt}$ may be calculated.

In addition, the input parameter acquisition unit 21 acquires the upper limit value $d_{max}$ of the inter-center distance d (S1). Then, if the calculated inter-center distance $d'_{opt}$ is longer than the upper limit value $d_{max}$ of the inter-center distance (S5: NO), the parameter calculation unit 22 calculates the minimum electric current intensity $I''_{opt}$ as the antenna parameter, based on the distance $Z_C$ to the boundary of the communication area, the magnetic field intensity $H_C$, and the upper limit value $d_{max}$ of the inter-center distance, such that the magnetic field intensity $H_C$ can be obtained at the boundary of the communication area with the inter-center distance d set equal to the upper limit value $d_{max}$ (S23). Thus, it is possible to calculate the electric current intensity of the current flow to the antennas in order to form the boundary of the communication area at a desired location. Since the electric current intensity I is minimized, the power consumption can be reduced.

The antenna parameter control apparatus 2 includes the parameter control unit 23 that controls the antenna parameters (d, I) for the two antennas 1A, 1B based on the antenna parameters ($d_{opt}$, $I_{opt}$) calculated by the parameter calculation unit 22. Hence, the boundary of the communication area can be established at a desired location.

Then, the antenna control system in the first embodiment includes the antenna parameter control apparatus 2 and the two antennas 1A, 1B, and therefore is capable of forming a communication area and establishing the boundary of the communication area at a desired location.

For example, if a user inputs the input parameters such as desired $Z_C$ indicating the size of the communication area, then the antenna parameters are calculated and the communication area is formed in an actual size according to the inputted $Z_C$. Thus, in the present embodiment, the size of the communication area can be changed freely. Moreover, since the communication area according to the calculated antenna parameters can be obtained, the precise size of the communication area can be ensured.

[Second Embodiment]

Next, a second embodiment is described. The second embodiment is different from the first embodiment in input parameters inputted by a user and a method of calculating $d_{opt}$ and $I_{opt}$, but is the same in the other things as those in the first embodiment. Hence, the description duplicating the first embodiment is omitted herein.

Figure 9:
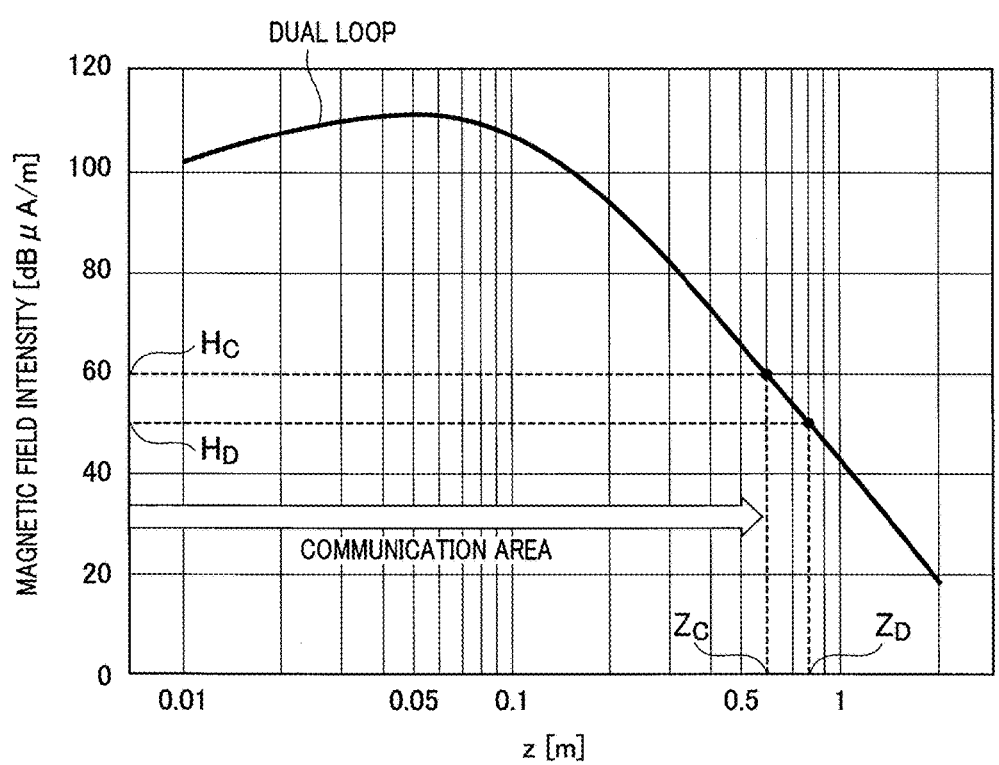
FIG. 9 is a diagram for explaining a method of selecting input parameters in the second embodiment.

FIG. 9 is a diagram for explaining a method of selecting input parameters in the second embodiment.

A user inputs six input parameters to the input device 20 by taking into account the size and characteristics of a communication area desired by himself/herself.

A first input parameter is a distance $Z_C$ from the antennas to the boundary of the communication area. A second input parameter is an arbitrary distance longer than $Z_C$. More specifically, the second input parameter is a distance $Z_D$ from the antennas to a predetermined location that is farther than the boundary of the communication area. A third parameter is a magnetic field intensity $H_C$ required at the boundary (the location at $Z_C$) of the communication area. A fourth input parameter is an upper limit value $H_D$ of the magnetic field intensity allowable at the location at $Z_D$. More specifically, this upper limit value $H_D$ of the magnetic field intensity is the upper limit value $H_D$ of the magnetic field intensity at the location at $Z_D$ farther than the boundary of the communication area. These values are presented in FIG. 9. Input of $Z_D$ and $H_D$ is equivalent to input of $A_{min}$ in the first embodiment. A fifth input parameter is the upper limit value $d_{max}$ of the inter-center distance d between the antennas. A sixth input parameter is the upper limit value $I_{max}$ of the electric current intensity I of the current flow to the antennas.

As in the first embodiment, the boundary of the communication area is established at a location at the distance $Z_C$ from the antenna array 1 in the z-axis direction, that is, the direction passing through the loop antennas. The communication area extends over the distance from 0 to $Z_C$ in the z-axis direction. In FIG. 9, DUAL LOOP presents a characteristic of the intensity of a magnetic field formed by the antenna array 1, and this is assumed to be a characteristic desired by the user. The magnetic field intensity at the location at $Z_C$ in FIG. 9 is the magnetic field intensity $H_C$ required at the boundary of the communication area. Then, the upper limit value of the magnetic field intensity at the location at $Z_D$ is the upper limit value $H_D$.

Since a value obtained by dividing a difference between $H_C$ and $H_D$ by a difference between $Z_C$ and $Z_D$ depends on the attenuation rate of the magnetic field intensity, the user may determine $H_D$ and $Z_D$ according to a desired attenuation rate of the magnetic field intensity.

In the second embodiment, the units of the input parameters are $Z_C$ [m], $Z_D$ [m], $H_C$ [dBpµA/m], $H_D$ [dBpµA/m], $d_{max}$ [m], and $I_{max}$ [A].

In the second embodiment, the user inputs the distances $Z_C$, $Z_D$, the magnetic field intensity $H_C$, the upper limit value $H_D$ of the magnetic field intensity, the upper limit value $d_{max}$ of the inter-center distance d, and the upper limit value $I_{max}$ of the electric current intensity I as the input parameters to the input device 20.

The input parameter acquisition unit 21 of the antenna parameter control apparatus 2 acquires these input parameters from the input device 20, and outputs the input parameters to the parameter calculation unit 22. Incidentally, the input parameter acquisition unit 21 may acquire the upper limit value $I_{max}$ of the electric current intensity I and the upper limit value $d_{max}$ of the inter-center distance d stored in the memory, and transmit these input parameters to the parameter calculation unit 22.

The parameter calculation unit 22 of the antenna parameter control apparatus 2 calculates the inter-center distance $d_{opt}$ satisfying the conditions that the requirements indicated by the six input parameters are satisfied and the electric current intensity I is minimized, and the electric current intensity $I_{ops}$ under the above conditions.

Specifically, based on the distances $Z_C$, $Z_D$, the magnetic field intensity $H_C$, and the upper limit value $H_D$ of the magnetic field intensity, the parameter calculation unit 22 calculates, as the antenna parameters, the inter-center distance $d'_{opt}$ ($d_{opt}$) such that: the magnetic field intensity He can be obtained at the boundary (the location at $Z_C$) of the communication area; the magnetic field intensity equal to the upper limit value $H_D$ can be obtained at the location (the location at $Z_D$) farther than the boundary of the communication area; and the electric current intensity I is minimized, and the electric current intensity $I'_{opt}$ ($I_{opt}$) thus found as minimum.

If the calculated inter-center distance $d'_{opt}$ is longer than the upper limit value $d_{max}$, the parameter calculation unit 22 calculates the minimum electric current intensity $I''_{opt}$ ($I_{opt}$) as the antenna parameter, based on the distance $Z_C$, the magnetic field intensity $H_C$, and the upper limit value $d_{max}$ ($d_{opt}=d''_{opt}$), such that the magnetic field intensity $H_C$ can be obtained at the boundary of the communication area with the inter-center distance d set equal to the upper limit value $d_{max}$.

Then, the parameter calculation unit 22 outputs the calculated antenna parameters to the parameter control unit 23.

The parameter control unit 23 controls the antenna parameters for the antennas 1A, 1B based on the antenna parameters calculated by the antenna parameter control apparatus 2.

Specifically, the parameter control unit 23 controls the inter-center distance d between the antennas 1A, 1B (antenna parameter) based on the calculated inter-center distance $d_{opt}$ ($d'_{opt}$ or $d''_{opt}$). For example, the parameter control unit 23 sends a control signal to the mechanical stages 10A, 10B, and thereby controls the mechanical stages 10A, 10B such that the inter-center distance d equals to the calculated inter-center distance $d_{opt}$ ($d'_{opt}$ or $d''_{opt}$).

The parameter control unit 23 controls the electric current intensity I of the current flow to the antennas 1A, 1B (antenna parameter) based on the calculated electric current intensity $I_{opt}$ ($I'_{opt}$ or $I''_{opt}$). For example, the parameter control unit 23 sends a control signal to the alternating current power source E, and thereby controls the alternating current power source E such that the electric current intensity I of the current flow to the antennas 1A, 1B equals to the calculated electric current intensity $I_{opt}$ ($I'_{opt}$ or $I''_{opt}$).

Figure 10:
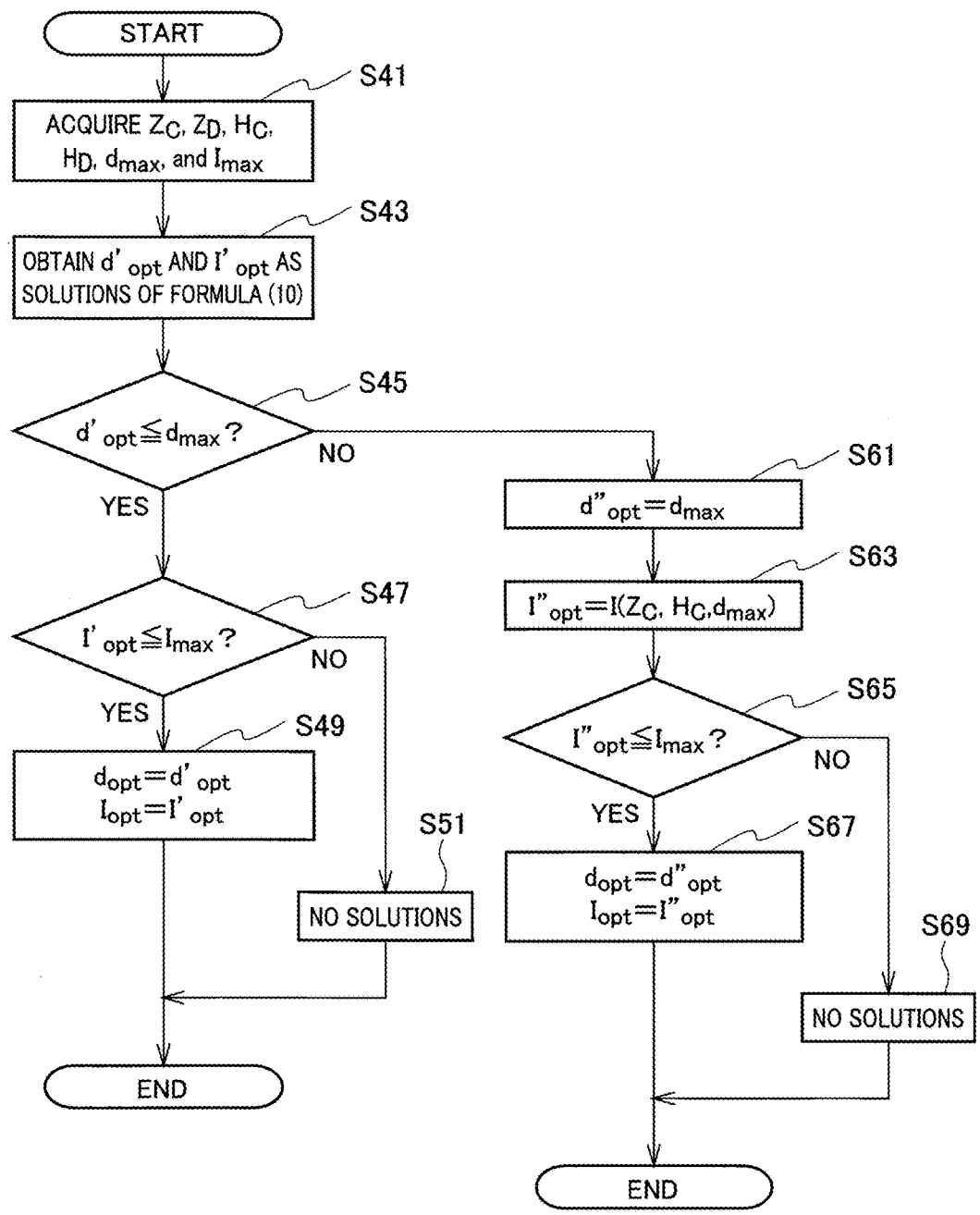
FIG. 10 is a flowchart presenting an example of a method of calculating antenna parameters in the second embodiment.

FIG. 10 is a flowchart presenting an example of a method of calculating antenna parameters in the second embodiment.

The input parameter acquisition unit 21 of the antenna parameter control apparatus 2 first acquires $Z_C$, $Z_D$, $H_C$, $H_D$, $d_{max}$, and $I_{max}$ from the input device 20 and so on as described above (S41).

In the antenna control system in FIG. 5, it is desirable to make the inter-center distance d as long as possible in order to minimize the electric current intensity I of the current flow to the antennas. On the other hand, if the inter-center distance d is made longer, the attenuation rate of the magnetic field intensity at the boundary (the location at $Z_C$) of the communication area is reduced. By taking these conditions into account, the parameter calculation unit 22 of the antenna parameter control apparatus 2 determines that a distance $d'_{opt}$ as a first candidate for $d_{opt}$ is d that makes it possible to obtain the minimum necessary attenuation rate of the magnetic field intensity. Moreover, the parameter calculation unit 22 determines that the electric current intensity $I'_{opt}$ as a first candidate for $I_{opt}$ is I obtained together with (accompanying) $d'_{opt}$.

In short, the parameter calculation unit 22 calculates $d'_{opt}$ as the first candidate for $d_{opt}$ and $I'_{opt}$ as the first candidate for $I_{opt}$ (S43).

To be more specific, the following simultaneous equations obtained from the formula (A6) are solved in step S43.

[Formula 21]

$$\begin{cases} H_C = 120 + 20\log_{10}\left[\dfrac{3}{4\pi} \cdot \dfrac{I'_{opt} S_{eff} d'_{opt}}{Z_C^4} \cdot \left\{1 + \left(\dfrac{d'_{opt}}{2Z_C}\right)^2\right\}^{-5/2}\right] \\ H_D = 120 + 20\log_{10}\left[\dfrac{3}{4\pi} \cdot \dfrac{I'_{opt} S_{eff} d'_{opt}}{Z_D^4} \cdot \left\{1 + \left(\dfrac{d'_{opt}}{2Z_D}\right)^2\right\}^{-5/2}\right] \end{cases} \quad (10)$$

The parameter calculation unit 22 obtains $d'_{opt}$ and $I'_{opt}$ as the solutions of the above simultaneous equations (S43).

Specifically, based on the distances $Z_C$, $Z_D$, the magnetic field intensity $H_C$, and the upper limit value $H_D$, the parameter calculation unit 22 calculates the inter-center distance $d'_{opt}$ and the electric current intensity $I'_{opt}$ as the antenna parameters such that the magnetic field intensity $H_C$ can be obtained at the boundary (the location at $Z_C$) of the communication area, the magnetic field intensity equal to the upper limit value $H_D$ can be obtained at the location (the location at $Z_D$) farther than the boundary of the communication area, and the electric current intensity I is minimized (S43). In sum, the inter-center distance $d'_{opt}$ and the electric current intensity $I'_{opt}$ can be calculated by using the formula (10).

Next, it is necessary to check whether or not ($d'_{opt}$, $I'_{opt}$) satisfy the user's input requirements.

First, the parameter calculation unit 22 determines whether or not $d'_{opt}$ satisfies the following requirement (S45).

[Formula 22]

$$d'_{opt} \leq d_{max} \quad (11)$$

Hereinafter, the description is further provided in each of the cases.

(i) Case where $d'_{opt} \leq d_{max}$ (S45: YES)

In this case, since the requirement for d is satisfied, the parameter calculation unit 22 next determines whether or not the user's input requirement for the electric current intensity I is satisfied (S47).

[Formula 23]

$$I'_{opt} \leq I_{max} \quad (12)$$

Specifically, the parameter calculation unit 22 determines whether or not $I'_{opt}$ satisfies the above formula (S47).

If YES is determined in step S47, $I'_{opt}$ satisfies the user's input requirement. In this case, the parameter calculation unit 22 outputs $d'_{opt}$, which is the first candidate for $d_{opt}$, as $d_{opt}$ (optimal solution) to the parameter control unit 23, outputs $I'_{opt}$, which is the first candidate for $I_{opt}$, as $I_{opt}$ (optimal solution) to the parameter control unit 23 (S49), and then terminates the processing.

In conclusion, the first candidates $d'_{opt}$ and $I'_{opt}$ are determined as true optimal solutions as in the following formula.

[Formula 24]

$$(d_{opt}, I_{opt}) = (d'_{opt}, I'_{opt}) \quad (13)$$

On the other hand, if NO is determined in step S47, solutions ($d_{opt}$, $I_{opt}$) satisfying the user's input requirements do not exist. Hence, in this case, the parameter calculation unit 22 determines "no solutions", then, for example, displays an alert indication on the display device or the like to prompt the user to input another input parameter(s) (S49), and terminates the processing.

(ii) Case where $d'_{opt} > d_{max}$ (S45: NO))

If the calculated inter-center distance $d'_{opt}$ is longer than the upper limit value $d_{max}$, the parameter calculation unit 22 employs $d_{max}$ as $d''_{opt}$ which is a second candidate for $d_{opt}$ as in the following formula (S61) in the same manner as the first embodiment.

[Formula 25]

$$d''_{opt} = d_{max} \quad (14)$$

Next, the parameter calculation unit 22 uses the following formula as in the formula (7) of the first embodiment.

[Formula 26]

$$I''_{opt} = I(Z_C, H_C, d_{max}) = \dfrac{4\pi}{3} \cdot 10^{(H_C - 120)/20} \cdot \dfrac{Z_C^4}{S_{eff} d_{max}} \cdot \left(1 + \left(\dfrac{d_{max}}{2Z_C}\right)^2\right)^{5/2} \quad (15)$$

In accordance with this, the parameter calculation unit 22 calculates $I''_{opt}$ (S63).

More specifically, based on the distance $Z_C$, the magnetic field intensity $H_C$, and the upper limit value $d_{max}$ of the inter-center distance, the parameter calculation unit 22 calculates the minimum electric current intensity $I''_{opt}$ as the antenna parameter such that the magnetic field intensity $H_C$ can be obtained at the boundary (the location at $Z_C$) of the communication area with the inter-center distance d set equal to the upper limit value $d_{max}$ (S63). In sum, the electric current intensity $I''_{opt}$ can be calculated by using the formula (15).

Next, the parameter calculation unit 22 determines whether or not $I''_{opt}$, which is the second candidate for $I_{opt}$, satisfies the user's input requirement (S65), as in the first embodiment.

[Formula 27]

$$I''_{opt} \leq I_{max} \quad (16)$$

Specifically, the parameter calculation unit 22 determines whether or not $I''_{opt}$ satisfies the above formula (S65).

If YES is determined in step S65, that is, if the formula (16) is satisfied, $I''_{opt}$ satisfies the user's input requirement.

Thus, the parameter calculation unit 22 outputs $d''_{opt}$ ($=d_{max}$), which is the second candidate for $d_{opt}$, as $d_{opt}$ (optimal solution) to the parameter control unit 23, outputs $I''_{opt}$, which is the second candidate for $I_{opt}$, as $I_{opt}$ (optimal solution) to the parameter control unit 23 (S67), and terminates the processing.

In conclusion, the second candidates $d''_{opt}$ ($=d_{max}$) and $I''_{opt}$ are determined as true optimal solutions as in the following formula.

[Formula 28]

$$(d_{opt}, I_{opt}) = (d''_{opt}, I''_{opt}) = (d_{max}, I(Z_C, H_C, d_{max})) = \left(d_{max}, \frac{4\pi}{3} \cdot 10^{(H_C - 120)/20} \cdot \frac{Z_C^4}{S_{eff} d_{max}} \cdot \left(1 + \left(\frac{d_{max}}{2Z_C}\right)^2\right)^{5/2}\right) \quad (17)$$

On the other hand, if NO is determined in step S65, solutions ($d_{opt}$, $I_{opt}$) satisfying the user's input requirements do not exist. Hence, in this case, the parameter calculation unit 22 determines "no solutions", then, for example, displays an alert indication on the display device or the like to prompt the user to input another input parameter(s) (S69), and terminates the processing as in the first embodiment.

Here, also in the second embodiment, $d_{max}$ and $I_{max}$ are not indispensable as in the first embodiment. That is, in the second embodiment, $d_{max}$ and $I_{max}$ are employed as the input requirements, but they are not essential. Accordingly, the processing may proceed from step S43 to step S49 while skipping steps S45 and S47. In other words, $d'_{opt}$ and $I'_{opt}$ obtained by the formula (10) may be used as $d_{opt}$ and $I_{opt}$.

As described above, the antenna parameter control apparatus 2 of the second embodiment is an antenna parameter control apparatus that calculates antenna parameters in a case of feeding the two antennas 1A, 1B with electric currents with an equal intensity I in the mutually reverse directions, and includes the input parameter acquisition unit 21 that acquires the input parameters for calculating the antenna parameters, and the parameter calculation unit 22 that calculates the inter-center distance between the antennas as the antenna parameter based on the input parameters. Thus, it is possible to provide an antenna control technique for forming the boundary of the communication area at a desired location. Specifically, it is possible to calculate the inter-center distance between the antennas (antenna parameter) for forming the boundary of the communication area at a desired location.

The input parameter acquisition unit 21 acquires, as the input parameters, the distance $Z_C$ from the antennas to the boundary of the communication area formed by the antennas, the distance $Z_D$ from the antennas to the location farther than the boundary of the communication area, the magnetic field intensity $H_C$ required at the boundary of the communication area, and the upper limit value $H_D$ of the magnetic field intensity at the location farther than the boundary of the communication area (S41). Then, based on the distances $Z_C$, $Z_D$, the magnetic field intensity $H_C$, and the upper limit value $H_D$ of the magnetic field intensity, the parameter calculation unit 22 calculates the inter-center distance $d'_{opt}$ between the antennas and the electric current intensity $I'_{opt}$ as the antenna parameters such that the magnetic field intensity $H_C$ can be obtained at the boundary (the location at $Z_C$) of the communication area, the magnetic field intensity equal to the upper limit value $H_D$ can be obtained at the location (the location at $Z_D$) farther than the boundary of the communication area, and the electric current intensity I is minimized (S43). Thus, it is possible to calculate the inter-center distance between the antennas and the electric current intensity of the current flow to the antennas for forming the boundary of the communication area at a desired location. In addition, since the electric current intensity I is minimized, the power consumption can be reduced.

In addition, the input parameter acquisition unit 21 acquires the upper limit value $d_{max}$ of the inter-center distance d (S41). Then, if the calculated inter-center distance $d'_{opt}$ is longer than the upper limit value $d_{max}$ of the inter-center distance (S45: NO), the parameter calculation unit 22 calculates the minimum electric current intensity $I''_{opt}$ as the antenna parameter based on the distance $Z_C$ to the boundary of the communication area, the magnetic field intensity $H_C$, and the upper limit value $d_{max}$ of the inter-center distance, such that the magnetic field intensity $H_C$ can be obtained at the boundary of the communication area with the inter-center distance d set equal to the upper limit value $d_{max}$ (S63). Thus, it is possible to calculate the electric current intensity of the current flow to the antennas for forming the boundary of the communication area at a desired location. Further, since the electric current intensity I is minimized, the power consumption can be reduced.

As in the first embodiment, the antenna parameter control apparatus 2 of the second embodiment includes the parameter control unit 23 that controls the antenna parameters (d, I) for the two antennas 1A, 1B based on the antenna parameters ($d_{opt}$, $I_{opt}$) calculated by the parameter calculation unit 22. Hence, the boundary of the communication area can be established at a desired location.

Then, as in the first embodiment, the antenna control system of the second embodiment includes the antenna parameter control apparatus 2 and the two antennas 1A, 1B, and therefore is capable of forming a communication area and establishing the boundary of the communication area at a desired location.

For example, if a user inputs the input parameters such as desired $Z_C$ indicating the size of the communication area, then the antenna parameters are calculated and the communication area is formed in an actual size according to the inputted $Z_C$. Thus, the size of the communication area can be changed freely. Moreover, since the communication area according to the calculated antenna parameters can be obtained, the precise size of the communication area can be ensured.

In the first and second embodiments, the antenna parameter control apparatus 2 is used to adjust the antenna parameters. Instead, the antenna parameter control apparatus 2 may be used only to calculate the antenna parameters. In this case, the parameter control unit 23 is unnecessary.

The antenna parameter control apparatus 2 may be implemented by a particular antenna parameter control program being loaded and executed by a computer including a processor (CPU). This antenna parameter control program can be recorded in computer-readable recording media such as a semiconductor memory, a magnetic disk, an optical disk, a magneto-optical disk, and a magnetic tape, or can be widely distributed through transmission via communication networks such as the Internet.

In the present specification, the loop antennas and the bar antennas are explained as the specific examples. These antennas are classified as dipole antennas (magnetic dipole antennas) that produce a magnetic field. The discussion made in the present specification may be applied to more general dipole antennas as well. Thus, the applicable antennas should not be limited to magnetic dipole antennas. In other words, the present disclosure can be applied to electric dipole antennas for use to generate an electric field, and is also effective to form a communication area by using an electric field.

Although the embodiments of the present invention have been described above, it should be understood that any description or drawing constituting part of the present disclosure does not limit the present invention. From the present disclosure, various alternative embodiments, examples, and application techniques would be apparent to those skilled in the art.

EXPLANATION OF THE REFERENCE NUMERALS 1 antenna array
1A, 1B antenna
2 antenna parameter control apparatus
21 input parameter acquisition unit
22 parameter calculation unit
23 parameter control unit
20 input device
10A, 10B: mechanical stage
$A_{min}$: lower limit value of attenuation rate of magnetic field intensity at boundary of communication area (input parameter)
d: inter-center distance between antennas (antenna parameter for the antennas 1A, 1B)
$d_{opt}$, $d'_{opt}$, $d''_{opt}$: inter-center distance between antennas (calculated antenna parameter)
$d_{max}$: upper limit value of inter-center distance d (input parameter)
E: alternating current power source
I: electric current intensity of current flow to antennas (antenna parameter for the antennas 1A, 1B)
$I_{opt}$, $I'_{opt}$, $I''_{opt}$: electric current intensity of current flow to antennas (calculated antenna parameter)
$I_{max}$: upper limit value of electric current intensity of current flow to antennas (input parameter)
$H_C$: magnetic field intensity required at boundary of communication area (input parameter)
$H_D$: upper limit value of magnetic field intensity at location farther than boundary of communication area (input parameter)
$Z_C$: distance from antennas to boundary of communication area (input parameter)
$Z_D$: distance from antennas to location farther than boundary of communication area (input parameter)

The invention claimed is:

1. An antenna control apparatus that controls an inter-center distance between two antennas, the antenna control apparatus comprising:
an input parameter acquisition unit that acquires, as input parameters, a distance from the two antennas to a boundary of a communication area formed by the antennas, and a lower limit value of an attenuation rate of a magnetic field intensity at the boundary of the communication area; and
a calculation unit that calculates, based on the distance to the boundary of the communication area and the lower limit value of the attenuation rate of the magnetic field intensity, the inter-center distance between the antennas such that the attenuation rate of the magnetic field intensity equal to the lower limit value is obtained at the boundary of the communication area and the intensity of the electric currents flowing through the antennas is minimized, wherein
the antennas are fed with the electric currents with an equal intensity in mutually reverse directions and
the calculation unit calculates the inter-center distance in accordance with the following formula:

$$d'_{opt} = d(Z_C, A_{min}) = 2Z_C \cdot \sqrt{\frac{80 - A_{min}}{20 + A_{min}}},$$

where $d'_{opt}$ denotes the inter-center distance, $Z_C$ denotes the distance to the boundary of the communication area, and $A_{min}$ denotes the lower limit value of the attenuation rate of the magnetic field intensity.

2. The antenna control apparatus according to claim 1, wherein
the input parameter acquisition unit acquires the magnetic field intensity required at the boundary of the communication area,
based on the distance to the boundary of the communication area, the magnetic field intensity, and the lower limit value of the attenuation rate of the magnetic field intensity, the calculation unit calculates the minimum intensity of the electric currents such that the magnetic field intensity and the attenuation rate of the magnetic field intensity equal to the lower limit value are obtained at the boundary of the communication area.

3. The antenna control apparatus according to claim 2, wherein
the calculation unit calculates the minimum intensity of the electric currents in accordance with the following formula:

$$I'_{opt} = I(Z_C, H_C, A_{min}) = \frac{2\pi}{3} \cdot 10^{(H_C - 120)/20} \cdot \frac{Z_C^3}{S_{eff}} \cdot \sqrt{\frac{20 + A_{min}}{80 - A_{min}}} \cdot \left(\frac{100}{20 + A_{min}}\right)^{5/2},$$

where $I'_{opt}$ denotes the minimum intensity of the electric currents, $Z_C$ denotes the distance to the boundary of the communication area, $H_C$ denotes the magnetic field intensity, $A_{min}$ denotes the lower limit value of the attenuation rate of the magnetic field intensity, and $S_{eff}$ denotes a constant indicating an effective area of each of the antennas.

4. The antenna control apparatus according to claim 1, wherein
the input parameter acquisition unit acquires an upper limit value of the inter-center distance,
the calculation unit calculates the minimum intensity of the electric currents based on the distance to the boundary of the communication area, the magnetic field intensity required at the boundary of the communication area, and the upper limit value of the inter-center distance, such that the magnetic field intensity required at the boundary of the communication area is obtained at the boundary of the communication area with the inter-center distance set equal to the upper limit value.

5. The antenna control apparatus according to claim 4, wherein
the calculation unit calculates the minimum intensity of the electric currents in accordance with the following formula:

$$I''_{opt} = I(Z_C, H_C, d_{max}) = \frac{4\pi}{3} \cdot 10^{(H_C - 120)/20} \cdot \frac{Z_C^4}{S_{eff} d_{max}} \cdot \left(1 + \left(\frac{d_{max}}{2Z_C}\right)^2\right)^{5/2},$$

where $I''_{opt}$ denotes the minimum intensity of the electric currents, $Z_C$ denotes the distance to the boundary of the communication area, $H_C$ denotes the magnetic field intensity required at the boundary of the communication area, $d_{max}$ denotes the upper limit value of the inter-center distance, and $S_{eff}$ denotes a constant indicating an effective area of each of the antennas.

6. The antenna control apparatus according to claim 1, further comprising a control unit that controls the two antennas based on the inter-center distance between the antennas calculated by the calculation unit.

7. An antenna control apparatus that controls an inter-center distance between two antennas, the antenna control apparatus comprising:
an input parameter acquisition unit that acquires, as input parameters, a distance from the two antennas to a boundary of a communication area formed by the antennas, a distance from the antennas to a location farther than the boundary of the communication area, a magnetic field intensity required at the boundary of the communication area, and an upper limit value of the magnetic field intensity at the location farther than the boundary of the communication area; and
a calculation unit that calculates, based on the distances, the magnetic field intensity, and the upper limit value, the inter-center distance between the antennas and the minimum intensity of the electric currents such that the magnetic field intensity required at the boundary of the communication area is obtained at the boundary of the communication area, the magnetic field intensity equal to the upper limit value is obtained at the location farther than the boundary of the communication area, and the electric currents flowing through the antennas are minimized, wherein
the antennas are fed with the electric currents with an equal intensity in mutually reverse directions and
the calculation unit obtains the inter-center distance and the minimum intensity of the electric currents as solutions of the following formula:

$$\begin{cases} H_C = 120 + 20\log_{10}\left[\frac{3}{4\pi} \cdot \frac{I'_{opt} S_{eff} d'_{opt}}{Z_C^4} \cdot \left\{1 + \left(\frac{d'_{opt}}{2Z_C}\right)^2\right\}^{-5/2}\right] \\ H_D = 120 + 20\log_{10}\left[\frac{3}{4\pi} \cdot \frac{I'_{opt} S_{eff} d'_{opt}}{Z_D^4} \cdot \left\{1 + \left(\frac{d'_{opt}}{2Z_D}\right)^2\right\}^{-5/2}\right] \end{cases},$$

where $d'_{opt}$ denotes the inter-center distance, $I'_{opt}$ denotes the minimum intensity of the electric currents, $Z_C$ denotes the distance to the boundary of the communication area, $Z_D$ denotes the distance to the location farther than the boundary of the communication area, $H_C$ denotes the magnetic field intensity required at the boundary of the communication area, $H_D$ denotes the upper limit value of the magnetic field intensity at the location farther than the boundary of the communication area, and $S_{eff}$ denotes a constant indicating an effective area of each of the antennas.

8. The antenna control apparatus according to claim 7, wherein
the input parameter acquisition unit acquires an upper limit value of the inter-center distance,
the calculation unit calculates the minimum intensity of the electric currents based on the distance to the boundary of the communication area, the magnetic field intensity required at the boundary of the communication area, and the upper limit value of the inter-center distance, such that the magnetic field intensity required at the boundary of the communication area is obtained at the boundary of the communication area with the inter-center distance set equal to the upper limit value.

9. The antenna control apparatus according to claim 8, wherein
the calculation unit calculates the minimum intensity of the electric currents in accordance with the following formula:

$$I''_{opt} = I(Z_C, H_C, d_{max}) = \frac{4\pi}{3} \cdot 10^{(H_C - 120)/20} \cdot \frac{Z_C^4}{S_{eff} d_{max}} \cdot \left(1 + \left(\frac{d_{max}}{2Z_C}\right)^2\right)^{5/2},$$

where $I''_{opt}$ t denotes the minimum intensity of the electric currents, $Z_C$ denotes the distance to the boundary of the communication area, $H_C$ denotes the magnetic field intensity required at the boundary of the communication area, $d_{max}$ denotes the upper limit value of the inter-center distance, and $S_{eff}$ denotes a constant indicating an effective area of each of the antennas.

10. The antenna control apparatus according to claim 7, further comprising a control unit that controls the two antennas based on the inter-center distance between the antennas calculated by the calculation unit.

11. A non-transitory computer readable medium storing an antenna control program that controls an inter-center distance between two antennas and causes a computer to execute a process comprising:
acquiring, as input parameters, a distance from the two antennas to a boundary of a communication area formed by the antennas, and a lower limit value of an attenuation rate of a magnetic field intensity at the boundary of the communication area; and
calculating, based on the distance to the boundary of the communication area and the lower limit value of the attenuation rate of the magnetic field intensity, the inter-center distance between the antennas such that the attenuation rate of the magnetic field intensity equal to the lower limit value is obtained at the boundary of the communication area and the intensity of electric currents flowing through the antennas is minimized, wherein
the antennas are fed with the electric currents with an equal intensity in mutually reverse directions and
the inter-center distance is calculated in accordance with the following formula:

$$d'_{opt} = d(Z_C, A_{min}) = 2Z_C \cdot \sqrt{\frac{80 - A_{min}}{20 + A_{min}}},$$

where $d'_{opt}$ denotes the inter-center distance, $Z_C$ denotes the distance to the boundary of the communication area, and $A_{min}$ denotes the lower limit value of the attenuation rate of the magnetic field intensity.

12. An antenna control system comprising:
the antenna control apparatus that controls an inter-center distance between two antennas and
the two antennas fed with electric currents with an equal intensity in mutually reverse directions, wherein
the antenna control apparatus comprising:
an input parameter acquisition unit that acquires, as input parameters, a distance from the two antennas to a boundary of a communication area formed by the antennas, and a lower limit value of an attenuation rate of a magnetic field intensity at the boundary of the communication area; and a calculation unit that calculates, based on the distance to the boundary of the communication area and the lower limit value of the attenuation rate of the magnetic field intensity, the inter-center distance between the antennas such that the attenuation rate of the magnetic field intensity equal to the lower limit value is obtained at the boundary of the communication area and the intensity of the electric currents flowing through the antennas is minimized, wherein the calculation unit calculates the inter-center distance in accordance with the following formula $$d'_{opt} = d(Z_C, A_{min}) = 2Z_C \cdot \sqrt{\frac{80 - A_{min}}{20 + A_{min}}},$$

where $d'_{opt}$ denotes the inter-center distance, $Z_C$ denotes the distance to the boundary of the communication area, and $A_{min}$ denotes the lower limit value of the attenuation rate of the magnetic field intensity.

13. The antenna control system according to claim 12, wherein the two antennas are loop antennas or bar antennas.

14. The antenna control system according to claim 12, wherein the two antennas are connected in series.

* * * * *